(12) United States Patent
Gong et al.

(10) Patent No.: US 12,578,549 B2
(45) Date of Patent: Mar. 17, 2026

(54) OPTICAL IMAGING LENS

(71) Applicant: GENIUS ELECTRONIC OPTICAL (XIAMEN) CO., LTD., Xiamen (CN)

(72) Inventors: Jinhui Gong, Xiamen (CN); Qingzhi Zhu, Xiamen (CN); Songchao Huang, Xiamen (CN); Hung-Chien Hsieh, Xiamen (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 778 days.

(21) Appl. No.: 17/844,054

(22) Filed: Jun. 20, 2022

(65) Prior Publication Data

US 2023/0296861 A1 Sep. 21, 2023

(30) Foreign Application Priority Data

Jan. 27, 2022 (CN) .......................... 202210111190.9

(51) Int. Cl.
 G02B 9/64 (2006.01)
 G02B 13/00 (2006.01)
(52) U.S. Cl.
 CPC ........... G02B 9/64 (2013.01); G02B 13/0045 (2013.01)
(58) Field of Classification Search
 CPC .......... G02B 9/64; G02B 13/009; G02B 3/04; G02B 13/0045; G02B 15/1445;
 (Continued)

(56) References Cited

U.S. PATENT DOCUMENTS

2006/0193060 A1 8/2006 Tomioka
2021/0325644 A1 10/2021 Zhang et al.

FOREIGN PATENT DOCUMENTS

CN 111538135 8/2020
CN 112684599 4/2021
(Continued)

OTHER PUBLICATIONS

English language translation of Chinese patent application No. CN112684599 [Yang et al}; downloaded from Espacenet at worldwide. espacenet.com on Aug. 6, 2025. English translation obtained from Google Translate tool on the website. (Year: 2021).*
(Continued)

*Primary Examiner* — Angela M. Medich
(74) *Attorney, Agent, or Firm* — JCIPRNET

(57) ABSTRACT

An optical imaging lens includes first to seventh lens elements sequentially arranged along an optical axis from an object side to an image side, and each including an object-side surface facing the object side and allowing an imaging ray to pass through and an image-side surface facing the image side and allowing the imaging ray to pass through. The first lens element has positive refracting power. A periphery region of the object-side surface of the fourth lens element is convex. The fifth lens element has positive refracting power. The sixth lens element has positive refracting power. An optical axis region of the object-side surface of the seventh lens element is convex. Lens elements of the optical imaging lens are only the seven lens elements described above. The optical imaging lens has at least one adjustable air gap.

20 Claims, 36 Drawing Sheets

(58) Field of Classification Search
CPC ........ G02B 15/1441; G02B 15/143507; G02B
15/177; G02B 27/0025; G02B 13/06;
G02B 13/02; G02B 30/00
See application file for complete search history.

(56) References Cited

FOREIGN PATENT DOCUMENTS

| | | |
|----|-----------|--------|
| CN | 113156633 | 7/2021 |
| TW | 200704994 | 2/2007 |
| TW | 201326888 | 7/2013 |
| TW | 202223484 | 6/2022 |

OTHER PUBLICATIONS

"Office Action of Taiwan Counterpart Application", issued on Nov. 11, 2022, p. 1-11.

* cited by examiner

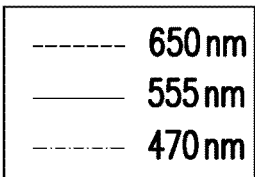
| | |
|---|---|
| ------ | 650 nm |
| —— | 555 nm |
| —·—· | 470 nm |
Longitudinal spherical aberration
Field of view
1.00
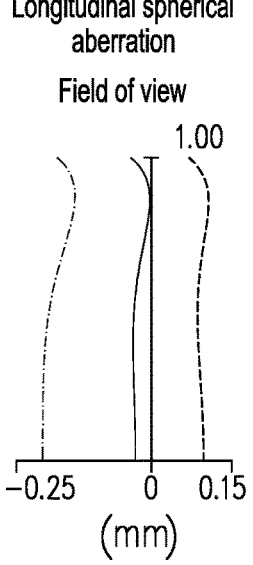
−0.25    0    0.15
(mm)
FIG. 7A
Field curvature (sagittal direction)
HFOV (°)
12.831
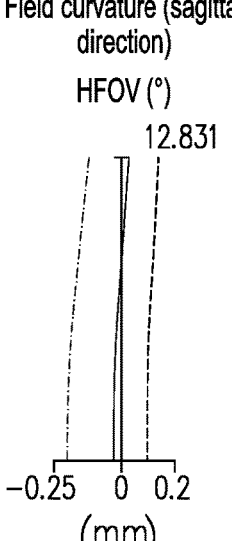
−0.25    0    0.2
(mm)
FIG. 7B
Field curvature (tangential direction)
HFOV (°)
12.831
−0.25    0    0.2
(mm)
FIG. 7C
Distortion
HFOV (°)
12.831
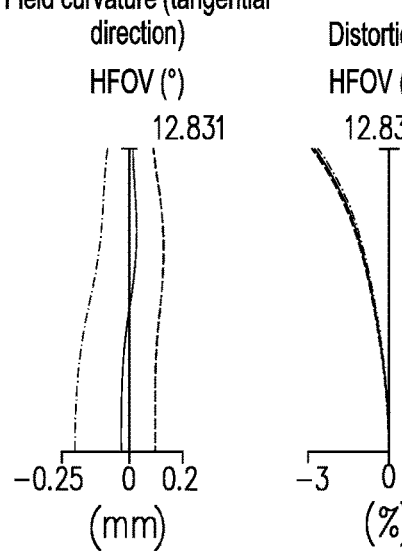
−3    0
(%)
FIG. 7D
Longitudinal spherical aberration
Field of view
1.00
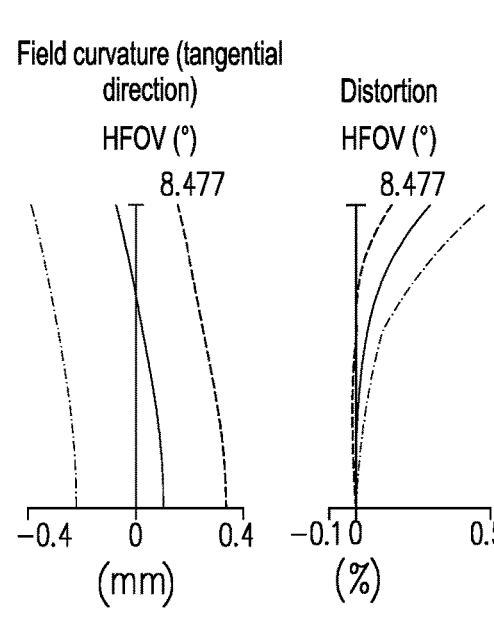
−0.4    0    0.35
(mm)
FIG. 7E
Field curvature (sagittal direction)
HFOV (°)
8.477
−0.3    0    0.4
(mm)
FIG. 7F
Field curvature (tangential direction)
HFOV (°)
8.477
−0.4    0    0.4
(mm)
FIG. 7G
Distortion
HFOV (°)
8.477
−0.1    0    0.5
(%)
FIG. 7H

| First embodiment | | | | | | |
|---|---|---|---|---|---|---|
| Short-focal-length (Wide-angle) | EFL=13.959 mm, Fno=3.021, HFOV=12.831°, ImgH=3.100 mm, TL=18.442 mm, BFL=2.825 mm, D1=3.482 mm, D2=2.958 mm, D3=1.916 mm | | | | | |
| Long-focal-length (Telephoto) | EFL=20.898 mm, Fno=4.524, HFOV=8.477°, ImgH=3.100 mm, TL=12.981 mm, BFL=7.686 mm D1=0.071 mm, D2=0.908 mm, D3=6.778 mm | | | | | |
| Device | Surface | Radius of curvature (mm) | Thickness (mm) | Refractive index | Abbe number | Focal length (mm) |
| Object | | Infinity | Infinity | | | |
| First lens element 1 | Object-side surface 15 | 12.249 | 1.088 | 1.584 | 30.374 | 16.632 |
| | Image-side surface 16 | -46.773 | 0.017 | | | |
| Second lens element 2 | Object-side surface 25 | 89.718 | 0.576 | 1.504 | 57.052 | -10.413 |
| Aperture 0 | Image-side surface 26 | 4.962 | D1 | | | |
| Third lens element 3 | Object-side surface 35 | 5.198 | 2.202 | 1.536 | 55.981 | 8.881 |
| | Image-side surface 36 | -51.185 | 0.889 | | | |
| Fourth lens element 4 | Object-side surface 45 | -26.780 | 1.008 | 1.671 | 19.243 | -12.538 |
| | Image-side surface 46 | 12.631 | 1.037 | | | |
| Fifth lens element 5 | Object-side surface 55 | 7.141 | 2.237 | 1.614 | 25.754 | 12.057 |
| | Image-side surface 56 | 147.716 | D2 | | | |
| Sixth lens element 6 | Object-side surface 65 | -7.382 | 2.239 | 1.567 | 37.490 | 35.452 |
| | Image-side surface 66 | -6.002 | 0.429 | | | |
| Seventh lens element 7 | Object-side surface 75 | 11.579 | 1.368 | 1.504 | 57.052 | -10.208 |
| | Image-side surface 76 | 3.428 | D3 | | | |
| Filter 9 | Object-side surface 95 | Infinity | 0.210 | 1.517 | 64.167 | |
| | Image-side surface 96 | Infinity | 0.699 | | | |
| | Image plane 99 | Infinity | | | | |

FIG. 8

| Surface | K | $a_4$ | $a_6$ | $a_8$ |
|---|---|---|---|---|
| 15 | -1.790615E+01 | -2.623840E-03 | -3.824199E-04 | -2.405686E-07 |
| 16 | 2.176772E+01 | -4.438203E-03 | -1.150199E-04 | 7.746496E-07 |
| 25 | -1.030447E+02 | 8.117480E-04 | 2.502121E-05 | 1.439109E-06 |
| 26 | -1.194033E+00 | 1.833322E-03 | -1.610072E-04 | 9.882082E-06 |
| 35 | -2.094784E+00 | 1.510045E-03 | -1.375887E-05 | 2.203350E-06 |
| 36 | 4.058079E+01 | -1.963125E-03 | 1.885304E-04 | -4.602041E-06 |
| 45 | -1.863531E+01 | 4.719905E-04 | 1.434831E-04 | -9.833073E-07 |
| 46 | 6.749994E+00 | 1.185573E-03 | 1.690012E-05 | 3.841866E-06 |
| 55 | -5.657844E+00 | -5.160158E-04 | -9.663884E-05 | -6.219443E-06 |
| 56 | -1.557511E+02 | 5.792916E-04 | -1.135037E-04 | 2.942868E-06 |
| 65 | -2.838767E+01 | 9.250138E-06 | 1.033244E-04 | -5.785436E-06 |
| 66 | -2.086945E+00 | -2.669568E-03 | 1.748068E-04 | -1.111117E-05 |
| 75 | -9.534154E+00 | -2.598578E-02 | 2.826025E-03 | -1.954454E-04 |
| 76 | -4.944531E+00 | -1.344907E-02 | 2.465681E-03 | -3.129911E-04 |
| Surface | $a_{10}$ | $a_{12}$ | $a_{14}$ | |
| 15 | 0.000000E+00 | 0.000000E+00 | 0.000000E+00 | |
| 16 | 0.000000E+00 | 0.000000E+00 | 0.000000E+00 | |
| 25 | 0.000000E+00 | 0.000000E+00 | 0.000000E+00 | |
| 26 | -8.687495E-07 | 0.000000E+00 | 0.000000E+00 | |
| 35 | -7.934297E-08 | 0.000000E+00 | 0.000000E+00 | |
| 36 | -5.635516E-08 | -1.775626E-08 | 0.000000E+00 | |
| 45 | -4.754668E-07 | -6.767446E-09 | 0.000000E+00 | |
| 46 | 7.180710E-07 | 0.000000E+00 | 0.000000E+00 | |
| 55 | 5.722023E-07 | 0.000000E+00 | 0.000000E+00 | |
| 56 | 1.632108E-07 | -5.351318E-08 | 0.000000E+00 | |
| 65 | 0.000000E+00 | 0.000000E+00 | 0.000000E+00 | |
| 66 | 1.314152E-06 | 0.000000E+00 | 0.000000E+00 | |
| 75 | 8.586064E-06 | 0.000000E+00 | 0.000000E+00 | |
| 76 | 2.801217E-05 | -1.602851E-06 | 4.611863E-08 | |

FIG. 9

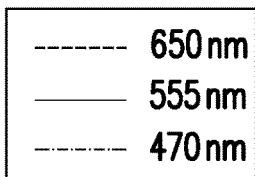
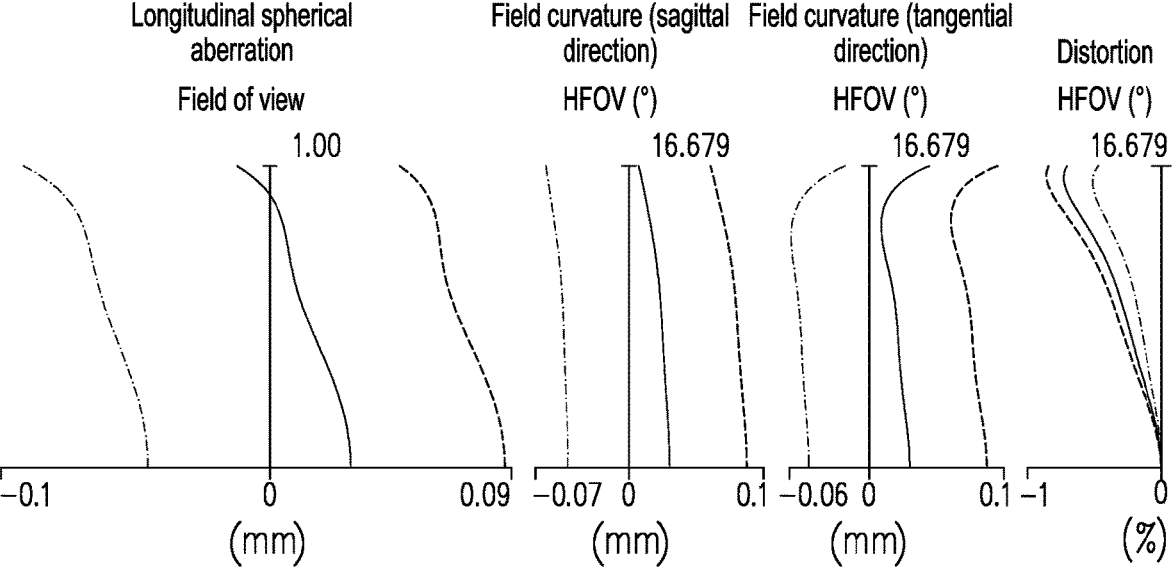
FIG. 11A          FIG. 11B FIG. 11C FIG. 11D
FIG. 11E          FIG. 11F          FIG. 11G          FIG. 11H

| Second embodiment | | | | | | |
|---|---|---|---|---|---|---|
| Short-focal-length (Wide-angle) | EFL=10.459 mm, Fno=2.239, HFOV=16.679°, ImgH=3.100 mm, TL=16.038 mm, BFL=1.661 mm, D1=2.884 mm, D2=2.467 mm, D3=1.274 mm | | | | | |
| Long-focal-length (Telephoto) | EFL=16.309 mm, Fno=3.491, HFOV=10.636°, ImgH=3.100 mm, TL=11.219 mm, BFL=6.487 mm D1=0.060 mm, D2=0.472 mm, D3=6.100 mm | | | | | |
| Device | Surface | Radius of curvature (mm) | Thickness (mm) | Refractive index | Abbe number | Focal length (mm) |
| Object | | Infinity | Infinity | | | |
| First lens element 1 | Object-side surface 15 | 10.205 | 0.931 | 1.584 | 30.374 | 14.081 |
| | Image-side surface 16 | -42.272 | 0.187 | | | |
| Second lens element 2 | Object-side surface 25 | 61.126 | 0.443 | 1.567 | 37.490 | -9.777 |
| Aperture 0 | Image-side surface 26 | 5.094 | D1 | | | |
| Third lens element 3 | Object-side surface 35 | 5.033 | 2.346 | 1.509 | 56.474 | 8.791 |
| | Image-side surface 36 | -35.581 | 0.491 | | | |
| Fourth lens element 4 | Object-side surface 45 | -27.607 | 0.458 | 1.567 | 37.490 | 32.274 |
| | Image-side surface 46 | 12.599 | 0.480 | | | |
| Fifth lens element 5 | Object-side surface 55 | 5.755 | 1.659 | 1.536 | 55.981 | 9.388 |
| | Image-side surface 56 | -37.503 | D2 | | | |
| Sixth lens element 6 | Object-side surface 65 | -7.671 | 2.606 | 1.671 | 19.243 | 27.824 |
| | Image-side surface 66 | -6.201 | 0.094 | | | |
| Seventh lens element 7 | Object-side surface 75 | 10.976 | 0.994 | 1.536 | 55.981 | -7.357 |
| | Image-side surface 76 | 2.819 | D3 | | | |
| Filter 9 | Object-side surface 95 | Infinity | 0.210 | 1.517 | 64.167 | |
| | Image-side surface 96 | Infinity | 0.177 | | | |
| | Image plane 99 | Infinity | | | | |

FIG. 12

| Surface | K | $a_4$ | $a_6$ | $a_8$ |
|---|---|---|---|---|
| 15 | -1.544541E+01 | -2.882003E-03 | -4.338089E-04 | 8.034601E-07 |
| 16 | 4.160024E+01 | -4.437850E-03 | -1.298556E-04 | -1.779287E-06 |
| 25 | -4.788037E+01 | 6.816655E-04 | -9.059384E-06 | 1.126988E-06 |
| 26 | -1.987202E+00 | 1.198090E-03 | -2.055083E-04 | 7.340332E-06 |
| 35 | -1.857840E+00 | 1.597569E-03 | -3.116685E-05 | 1.525891E-06 |
| 36 | 6.068029E+01 | -2.278372E-03 | 1.871670E-04 | -4.076443E-06 |
| 45 | -2.493263E+01 | 2.947791E-04 | 1.385733E-04 | 2.592201E-07 |
| 46 | 9.686526E+00 | 1.766866E-03 | 5.054229E-05 | 4.278677E-06 |
| 55 | -3.250110E+00 | 2.793195E-04 | -3.533958E-05 | -1.656558E-06 |
| 56 | 3.165825E+01 | 9.952262E-04 | -9.358258E-05 | 4.909611E-07 |
| 65 | -2.145396E+01 | 5.644814E-04 | 9.598261E-05 | -4.343979E-06 |
| 66 | -1.724263E+01 | -6.014099E-04 | 3.130020E-04 | -1.517398E-06 |
| 75 | -5.102272E+00 | -2.440371E-02 | 3.025662E-03 | -2.037460E-04 |
| 76 | -5.561597E+00 | -1.344907E-02 | 2.465681E-03 | -3.129911E-04 |
| Surface | $a_{10}$ | $a_{12}$ | $a_{14}$ | |
| 15 | 0.000000E+00 | 0.000000E+00 | 0.000000E+00 | |
| 16 | 0.000000E+00 | 0.000000E+00 | 0.000000E+00 | |
| 25 | 0.000000E+00 | 0.000000E+00 | 0.000000E+00 | |
| 26 | -3.601273E-07 | 0.000000E+00 | 0.000000E+00 | |
| 35 | -2.632868E-08 | 0.000000E+00 | 0.000000E+00 | |
| 36 | 3.925474E-09 | 2.278410E-10 | 0.000000E+00 | |
| 45 | -2.282302E-07 | 4.591460E-10 | 0.000000E+00 | |
| 46 | 5.862042E-07 | 0.000000E+00 | 0.000000E+00 | |
| 55 | 7.008381E-07 | 0.000000E+00 | 0.000000E+00 | |
| 56 | 8.624868E-08 | 1.482993E-08 | 0.000000E+00 | |
| 65 | 0.000000E+00 | 0.000000E+00 | 0.000000E+00 | |
| 66 | 1.267876E-06 | 0.000000E+00 | 0.000000E+00 | |
| 75 | 8.278054E-06 | 0.000000E+00 | 0.000000E+00 | |
| 76 | 2.801217E-05 | -1.602851E-06 | 4.611863E-08 | |

FIG. 13

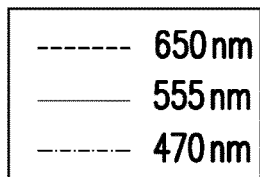
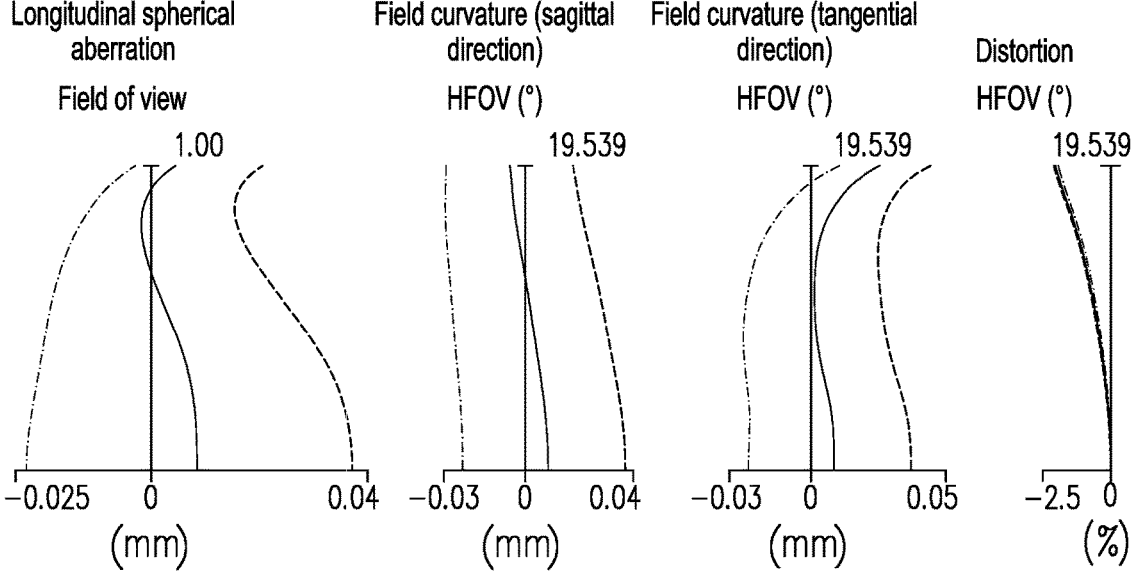
FIG. 15A          FIG. 15B          FIG. 15C          FIG. 15D
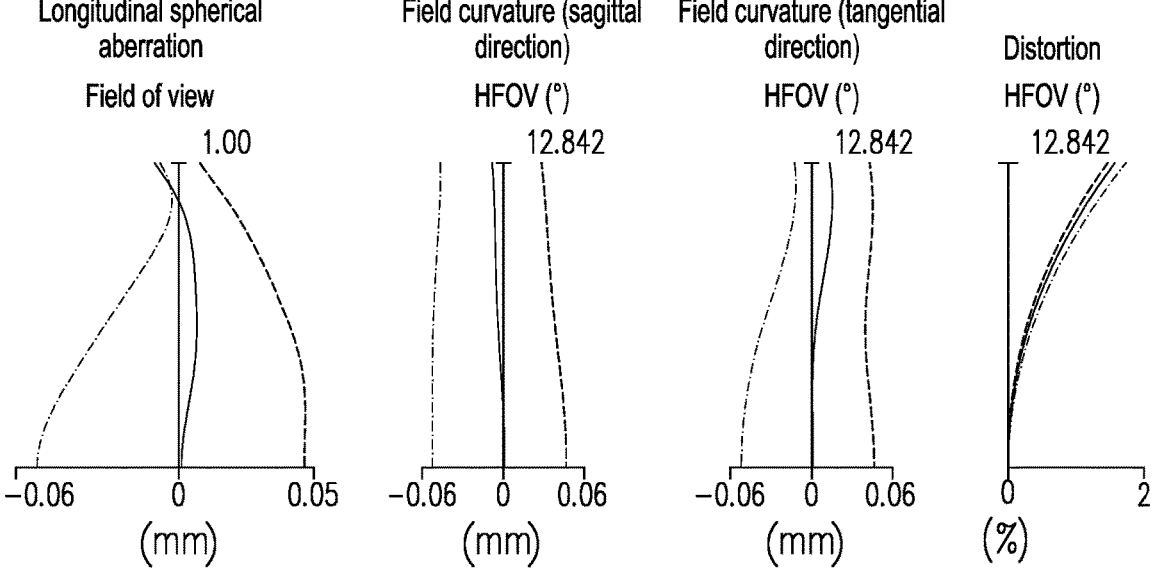
FIG. 15E          FIG. 15F          FIG. 15G          FIG. 15H

| Third embodiment | | | | | | |
|---|---|---|---|---|---|---|
| Short-focal-length (Wide-angle) | EFL=8.927 mm, Fno=1.927, HFOV=16.196°, ImgH=3.100 mm, TL=14.284 mm, BFL=1.412 mm, D1=2.605 mm, D2=2.486 mm, D3=1.056 mm | | | | | |
| Long-focal-length (Telephoto) | EFL=13.390 mm, Fno=2.891, HFOV=12.842°, ImgH=3.100 mm, TL=10.327 mm, BFL=5.857 mm D1=0.866 mm, D2=0.269 mm, D3=5.502 mm | | | | | |
| Device | Surface | Radius of curvature (mm) | Thickness (mm) | Refractive index | Abbe number | Focal length (mm) |
| Object | | Infinity | Infinity | | | |
| First lens element 1 | Object-side surface 15 | 10.328 | 1.050 | 1.584 | 30.374 | 14.550 |
| | Image-side surface 16 | -47.798 | 0.056 | | | |
| Second lens element 2 | Object-side surface 25 | 62.860 | 0.400 | 1.544 | 49.922 | -10.218 |
| Aperture 0 | Image-side surface 26 | 5.116 | D1 | | | |
| Third lens element 3 | Object-side surface 35 | 5.046 | 1.645 | 1.536 | 55.981 | 8.326 |
| | Image-side surface 36 | -35.732 | 0.429 | | | |
| Fourth lens element 4 | Object-side surface 45 | -27.383 | 0.400 | 1.671 | 19.276 | -12.781 |
| | Image-side surface 46 | 12.741 | 0.451 | | | |
| Fifth lens element 5 | Object-side surface 55 | 5.380 | 1.297 | 1.544 | 49.922 | 8.291 |
| | Image-side surface 56 | -26.254 | D2 | | | |
| Sixth lens element 6 | Object-side surface 65 | -9.340 | 2.398 | 1.582 | 30.186 | 15.835 |
| | Image-side surface 66 | -5.096 | 0.092 | | | |
| Seventh lens element 7 | Object-side surface 75 | 10.960 | 0.975 | 1.544 | 49.922 | -5.870 |
| | Image-side surface 76 | 2.403 | D3 | | | |
| Filter 9 | Object-side surface 95 | Infinity | 0.210 | 1.517 | 64.167 | |
| | Image-side surface 96 | Infinity | 0.146 | | | |
| | Image plane 99 | Infinity | | | | |

FIG. 16

| Surface | K | a4 | a6 | a8 |
|---|---|---|---|---|
| 15 | -1.785847E+01 | -3.023966E-03 | -4.308685E-04 | 8.137226E-06 |
| 16 | -5.804865E+01 | -4.318283E-03 | -1.123777E-04 | 5.285451E-07 |
| 25 | 7.999432E+01 | 8.129609E-04 | -1.554391E-05 | -2.098603E-06 |
| 26 | -2.557906E+00 | 8.436029E-04 | -2.173531E-04 | 7.870823E-06 |
| 35 | -1.941657E+00 | 1.498812E-03 | -5.195192E-05 | -2.928822E-07 |
| 36 | 6.727723E+01 | -2.310558E-03 | 1.879058E-04 | -4.201690E-06 |
| 45 | -4.722238E+01 | 3.945336E-04 | 1.494347E-04 | 1.178032E-06 |
| 46 | 8.723353E+00 | 1.644038E-03 | 3.778152E-05 | 3.784782E-06 |
| 55 | -2.974231E+00 | 4.285670E-04 | -1.924283E-05 | -1.380181E-06 |
| 56 | -6.661986E+00 | 1.207097E-03 | -7.297863E-05 | 1.506207E-06 |
| 65 | -3.558886E+01 | 4.524824E-04 | 1.431661E-04 | -4.028006E-06 |
| 66 | -1.202829E+01 | -1.983720E-03 | 2.340210E-04 | -3.781549E-06 |
| 75 | -8.012932E+01 | -2.525918E-02 | 2.818600E-03 | -2.246491E-04 |
| 76 | -4.982650E+00 | -1.344907E-02 | 2.465681E-03 | -3.129911E-04 |

| Surface | a10 | a12 | a14 |
|---|---|---|---|
| 15 | 0.000000E+00 | 0.000000E+00 | 0.000000E+00 |
| 16 | 0.000000E+00 | 0.000000E+00 | 0.000000E+00 |
| 25 | 0.000000E+00 | 0.000000E+00 | 0.000000E+00 |
| 26 | -1.116101E-07 | 0.000000E+00 | 0.000000E+00 |
| 35 | -1.981976E-07 | 0.000000E+00 | 0.000000E+00 |
| 36 | -5.347770E-08 | 4.854184E-09 | 0.000000E+00 |
| 45 | -4.478467E-08 | 1.334913E-08 | 0.000000E+00 |
| 46 | 2.574625E-07 | 0.000000E+00 | 0.000000E+00 |
| 55 | 7.634768E-07 | 0.000000E+00 | 0.000000E+00 |
| 56 | 1.801885E-07 | 2.039592E-08 | 0.000000E+00 |
| 65 | 0.000000E+00 | 0.000000E+00 | 0.000000E+00 |
| 66 | -7.781369E-07 | 0.000000E+00 | 0.000000E+00 |
| 75 | 7.561834E-06 | 0.000000E+00 | 0.000000E+00 |
| 76 | 2.801217E-05 | -1.602851E-06 | 4.611863E-08 |

FIG. 17

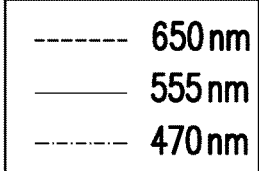
| | |
|---|---|
| ------- | 650 nm |
| ——— | 555 nm |
| —·—··— | 470 nm |
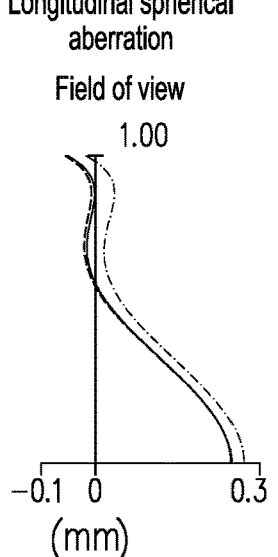
Longitudinal spherical
aberration
Field of view
1.00
-0.1  0      0.3
(mm)
FIG. 19A
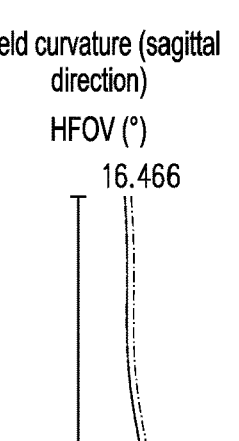
Field curvature (sagittal
direction)
HFOV (°)
16.466
0      0.3
(mm)
FIG. 19B
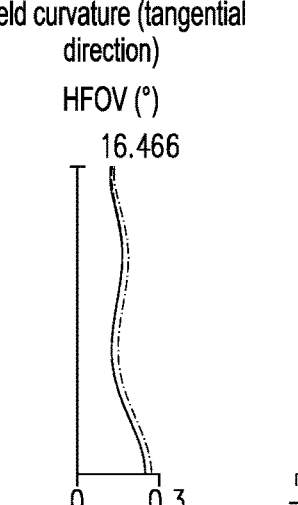
Field curvature (tangential
direction)
HFOV (°)
16.466
0      0.3
(mm)
FIG. 19C
Distortion
HFOV (°)
16.466
-2            0
(%)
FIG. 19D
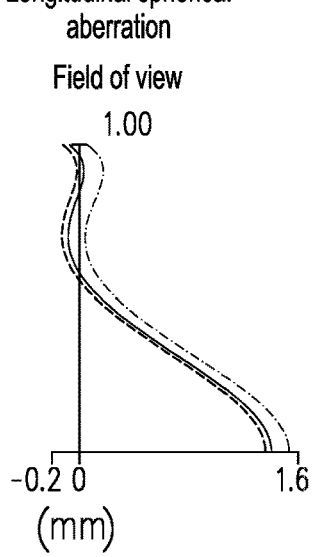
Longitudinal spherical
aberration
Field of view
1.00
-0.2  0      1.6
(mm)
FIG. 19E
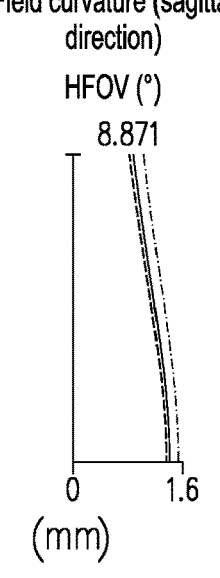
Field curvature (sagittal
direction)
HFOV (°)
8.871
0      1.6
(mm)
FIG. 19F
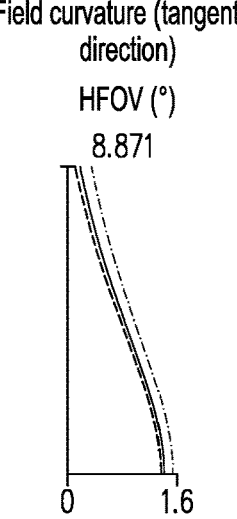
Field curvature (tangential
direction)
HFOV (°)
8.871
0      1.6
(mm)
FIG. 19G
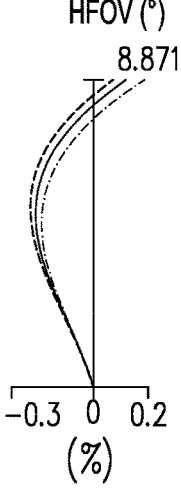
Distortion
HFOV (°)
8.871
-0.3  0  0.2
(%)
FIG. 19H

| Fourth embodiment | | | | | | |
|---|---|---|---|---|---|---|
| Short-focal-length (Wide-angle) | EFL=11.029 mm, Fno=2.385, HFOV=16.466°, ImgH=3.100 mm, TL=15.368 mm, BFL=1.927 mm, D1=2.727 mm, D2=2.505 mm, D3=1.015 mm | | | | | |
| Long-focal-length (Telephoto) | EFL=22.069 mm, Fno=4.771, HFOV=8.871°, ImgH=3.100 mm, TL=10.416 mm, BFL=8.812 mm D1=0.055 mm, D2=0.225 mm, D3=7.900 mm | | | | | |
| Device | Surface | Radius of curvature (mm) | Thickness (mm) | Refractive index | Abbe number | Focal length (mm) |
| Object | | Infinity | Infinity | | | |
| First lens element 1 | Object-side surface 15 | 10.491 | 1.039 | 1.588 | 28.433 | 14.474 |
| | Image-side surface 16 | -44.899 | 0.055 | | | |
| Second lens element 2 | Object-side surface 25 | 75.840 | 0.402 | 1.567 | 37.490 | -9.376 |
| Aperture 0 | Image-side surface 26 | 4.982 | D1 | | | |
| Third lens element 3 | Object-side surface 35 | 4.976 | 2.229 | 1.536 | 55.981 | 8.226 |
| | Image-side surface 36 | -34.109 | 0.498 | | | |
| Fourth lens element 4 | Object-side surface 45 | -30.698 | 0.517 | 1.671 | 19.243 | -13.449 |
| | Image-side surface 46 | 13.047 | 0.279 | | | |
| Fifth lens element 5 | Object-side surface 55 | 5.661 | 1.520 | 1.536 | 55.981 | 9.155 |
| | Image-side surface 56 | -34.700 | D2 | | | |
| Sixth lens element 6 | Object-side surface 65 | -7.721 | 2.411 | 1.671 | 19.243 | 24.587 |
| | Image-side surface 66 | -5.941 | 0.086 | | | |
| Seventh lens element 7 | Object-side surface 75 | 13.189 | 1.103 | 1.536 | 55.981 | -6.209 |
| | Image-side surface 76 | 2.590 | D3 | | | |
| Filter 9 | Object-side surface 95 | Infinity | 0.210 | 1.517 | 64.167 | |
| | Image-side surface 96 | Infinity | 0.702 | | | |
| | Image plane 99 | Infinity | | | | |

FIG. 20

| Surface | K | $a_4$ | $a_6$ | $a_8$ |
|---|---|---|---|---|
| 15 | -1.164263E+01 | -2.842310E-03 | -4.556190E-04 | 9.100521E-07 |
| 16 | 4.209993E+01 | -4.476082E-03 | -1.230359E-04 | -2.900100E-06 |
| 25 | 3.880784E+00 | 6.444284E-04 | -3.525087E-05 | 8.237076E-07 |
| 26 | -2.016789E+00 | 1.229130E-03 | -1.616342E-04 | 7.571263E-06 |
| 35 | -1.683107E+00 | 1.687483E-03 | -3.608804E-05 | 1.484098E-06 |
| 36 | 6.212011E+01 | -2.294603E-03 | 1.930817E-04 | -4.076392E-06 |
| 45 | -5.805560E+01 | 3.753944E-04 | 1.347708E-04 | 4.019264E-07 |
| 46 | 9.369326E+00 | 1.649057E-03 | 5.515238E-05 | 3.753441E-06 |
| 55 | -3.399107E+00 | 1.912475E-04 | -4.568998E-05 | -1.175607E-06 |
| 56 | -8.151806E+01 | 1.429179E-03 | -7.986283E-05 | 1.999679E-07 |
| 65 | -3.771941E+01 | 1.304187E-04 | 1.206918E-04 | 5.472808E-06 |
| 66 | -1.411459E+01 | -8.288682E-04 | 1.607097E-04 | -2.526658E-05 |
| 75 | -4.594442E+01 | -2.613550E-02 | 2.927559E-03 | -2.055957E-04 |
| 76 | -5.392694E+00 | -1.344907E-02 | 2.465681E-03 | -3.129911E-04 |

| Surface | $a_{10}$ | $a_{12}$ | $a_{14}$ |
|---|---|---|---|
| 15 | 0.000000E+00 | 0.000000E+00 | 0.000000E+00 |
| 16 | 0.000000E+00 | 0.000000E+00 | 0.000000E+00 |
| 25 | 0.000000E+00 | 0.000000E+00 | 0.000000E+00 |
| 26 | -1.343612E-06 | 0.000000E+00 | 0.000000E+00 |
| 35 | -9.936855E-09 | 0.000000E+00 | 0.000000E+00 |
| 36 | -8.278563E-09 | 1.744200E-11 | 0.000000E+00 |
| 45 | -2.178099E-07 | -1.318989E-09 | 0.000000E+00 |
| 46 | 5.767260E-07 | 0.000000E+00 | 0.000000E+00 |
| 55 | 7.036349E-07 | 0.000000E+00 | 0.000000E+00 |
| 56 | 1.837645E-07 | 3.372870E-08 | 0.000000E+00 |
| 65 | 0.000000E+00 | 0.000000E+00 | 0.000000E+00 |
| 66 | 1.477267E-06 | 0.000000E+00 | 0.000000E+00 |
| 75 | 4.666023E-06 | 0.000000E+00 | 0.000000E+00 |
| 76 | 2.801217E-05 | -1.602851E-06 | 4.611863E-08 |

FIG. 21

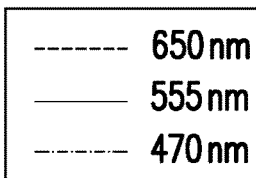
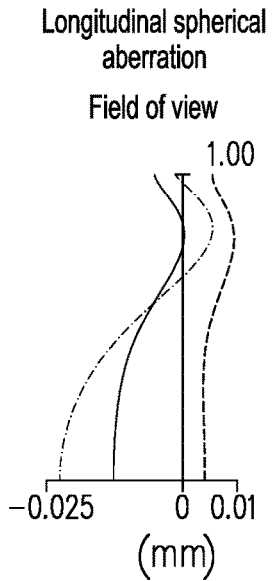
Longitudinal spherical
aberration
Field of view
1.00
-0.025   0   0.01
(mm)
FIG. 23A
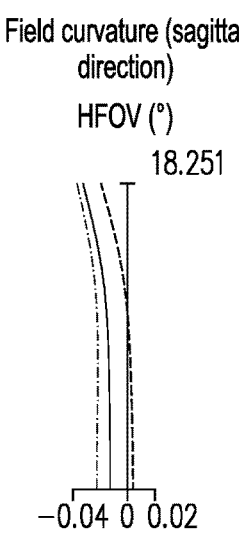
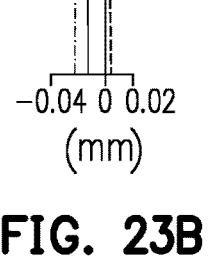
Field curvature (sagittal
direction)
HFOV (°)
18.251
-0.04 0 0.02
(mm)
FIG. 23B
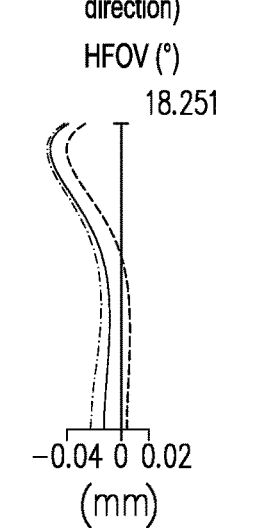
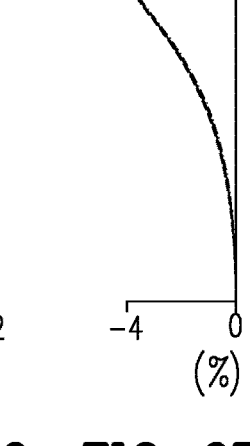
Field curvature (tangential
direction)
HFOV (°)
18.251
-0.04 0 0.02
(mm)
FIG. 23C
Distortion
HFOV (°)
18.251
-4        0
(%)
FIG. 23D
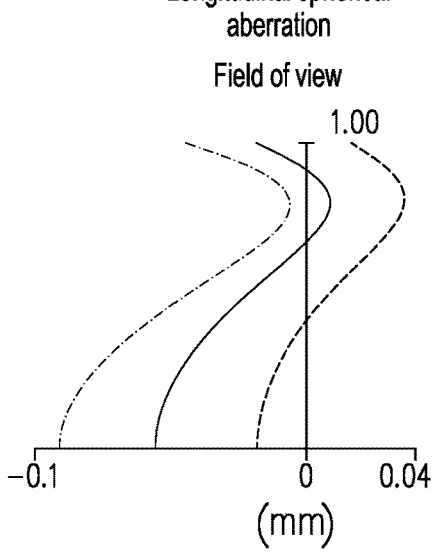
Longitudinal spherical
aberration
Field of view
1.00
-0.1        0   0.04
(mm)
FIG. 23E
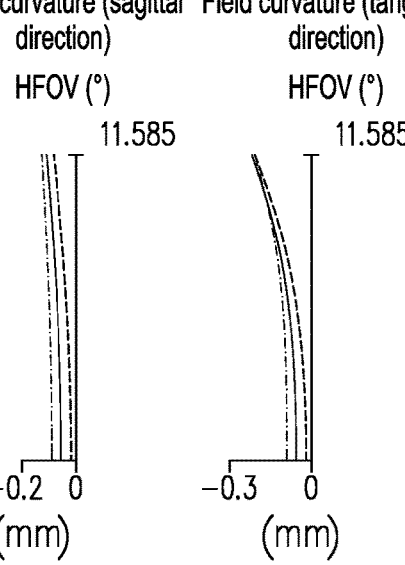
Field curvature (sagittal
direction)
HFOV (°)
11.585
-0.2   0
(mm)
FIG. 23F
Field curvature (tangential
direction)
HFOV (°)
11.585
-0.3      0
(mm)
FIG. 23G
Distortion
HFOV (°)
11.585
0        3
(%)
FIG. 23H

| Fifth embodiment | | | | | | |
|---|---|---|---|---|---|---|
| Short-focal-length (Wide-angle) | EFL=9.740 mm, Fno=2.056, HFOV=18.251°, ImgH=3.100 mm, TL=14.698 mm, BFL=2.044 mm, D1=3.187 mm, D2=2.475 mm, D3=1.521 mm | | | | | |
| Long-focal-length (Telephoto) | EFL=14.708 mm, Fno=3.105, HFOV=11.585°, ImgH=3.100 mm, TL=9.448 mm, BFL=6.657 mm D1=0.093 mm, D2=0.319 mm, D3=6.135 mm | | | | | |
| Device | Surface | Radius of curvature (mm) | Thickness (mm) | Refractive index | Abbe number | Focal length (mm) |
| Object | | Infinity | Infinity | | | |
| First lens element 1 | Object-side surface 15 | 10.150 | 1.170 | 1.588 | 28.433 | 13.854 |
| | Image-side surface 16 | -40.787 | 0.186 | | | |
| Second lens element 2 | Object-side surface 25 | 62.242 | 0.503 | 1.567 | 37.490 | -9.706 |
| Aperture 0 | Image-side surface 26 | 5.066 | D1 | | | |
| Third lens element 3 | Object-side surface 35 | 5.002 | 1.903 | 1.536 | 55.981 | 8.271 |
| | Image-side surface 36 | -35.351 | 0.475 | | | |
| Fourth lens element 4 | Object-side surface 45 | -29.888 | 0.425 | 1.671 | 19.243 | -13.196 |
| | Image-side surface 46 | 12.830 | 0.089 | | | |
| Fifth lens element 5 | Object-side surface 55 | 5.664 | 1.390 | 1.536 | 55.981 | 9.175 |
| | Image-side surface 56 | -35.482 | D2 | | | |
| Sixth lens element 6 | Object-side surface 65 | -8.279 | 1.678 | 1.671 | 19.243 | 20.687 |
| | Image-side surface 66 | -5.631 | 0.087 | | | |
| Seventh lens element 7 | Object-side surface 75 | 11.593 | 1.129 | 1.536 | 55.981 | -6.842 |
| | Image-side surface 76 | 2.701 | D3 | | | |
| Filter 9 | Object-side surface 95 | Infinity | 0.210 | 1.517 | 64.167 | |
| | Image-side surface 96 | Infinity | 0.312 | | | |
| | Image plane 99 | Infinity | | | | |

FIG. 24

| Surface | K | $a_4$ | $a_6$ | $a_8$ |
|---|---|---|---|---|
| 15 | -1.436806E+01 | -2.804351E-03 | -4.258923E-04 | 6.869393E-08 |
| 16 | 6.054363E+01 | -4.514031E-03 | -1.309082E-04 | 2.720051E-07 |
| 25 | 1.835390E+01 | 7.176131E-04 | -5.786260E-06 | 1.292326E-07 |
| 26 | -1.945804E+00 | 1.234324E-03 | -1.956500E-04 | 8.356416E-06 |
| 35 | -1.844020E+00 | 1.603261E-03 | -3.127367E-05 | 1.507883E-06 |
| 36 | 5.935959E+01 | -2.254586E-03 | 1.881367E-04 | -3.987738E-06 |
| 45 | -3.343868E+01 | 3.313937E-04 | 1.401492E-04 | 2.452605E-07 |
| 46 | 9.466041E+00 | 1.705224E-03 | 4.505743E-05 | 4.225927E-06 |
| 55 | -3.354867E+00 | 2.526694E-04 | -3.510080E-05 | -1.507252E-06 |
| 56 | 1.503079E+01 | 1.046902E-03 | -8.378757E-05 | 9.737336E-07 |
| 65 | -2.939863E+01 | 8.473562E-04 | 1.226684E-04 | 5.293923E-07 |
| 66 | -1.018570E+01 | -1.730390E-03 | 2.461834E-04 | -9.090714E-06 |
| 75 | -2.094976E+01 | -2.557327E-02 | 2.833962E-03 | -2.191542E-04 |
| 76 | -4.275599E+00 | -1.363465E-02 | 2.391453E-03 | -3.123462E-04 |
| Surface | $a_{10}$ | $a_{12}$ | $a_{14}$ | $a_{16}$ |
| 15 | 0.000000E+00 | 0.000000E+00 | 0.000000E+00 | 0.000000E+00 |
| 16 | 0.000000E+00 | 0.000000E+00 | 0.000000E+00 | 0.000000E+00 |
| 25 | 0.000000E+00 | 0.000000E+00 | 0.000000E+00 | 0.000000E+00 |
| 26 | -3.128864E-07 | 0.000000E+00 | 0.000000E+00 | 0.000000E+00 |
| 35 | -2.684022E-08 | 0.000000E+00 | 0.000000E+00 | 0.000000E+00 |
| 36 | 8.223386E-09 | 3.647890E-10 | 0.000000E+00 | 0.000000E+00 |
| 45 | -2.347104E-07 | 1.157650E-10 | 0.000000E+00 | 0.000000E+00 |
| 46 | 6.122295E-07 | 0.000000E+00 | 0.000000E+00 | 0.000000E+00 |
| 55 | 7.462442E-07 | 1.247115E-09 | 1.586520E-10 | 7.214000E-12 |
| 56 | 6.147349E-08 | -2.124098E-09 | 0.000000E+00 | 0.000000E+00 |
| 65 | 6.021819E-08 | 5.046120E-09 | 5.173590E-10 | 3.860300E-11 |
| 66 | -3.075504E-08 | -1.761466E-09 | -2.717320E-10 | -5.439800E-11 |
| 75 | 7.487902E-06 | 1.259185E-09 | -5.038370E-10 | -6.144300E-11 |
| 76 | 2.819732E-05 | -1.584816E-06 | 4.733302E-08 | 0.000000E+00 |

FIG. 25

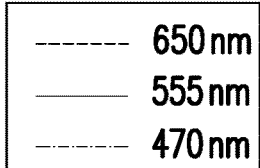
650 nm
555 nm
470 nm
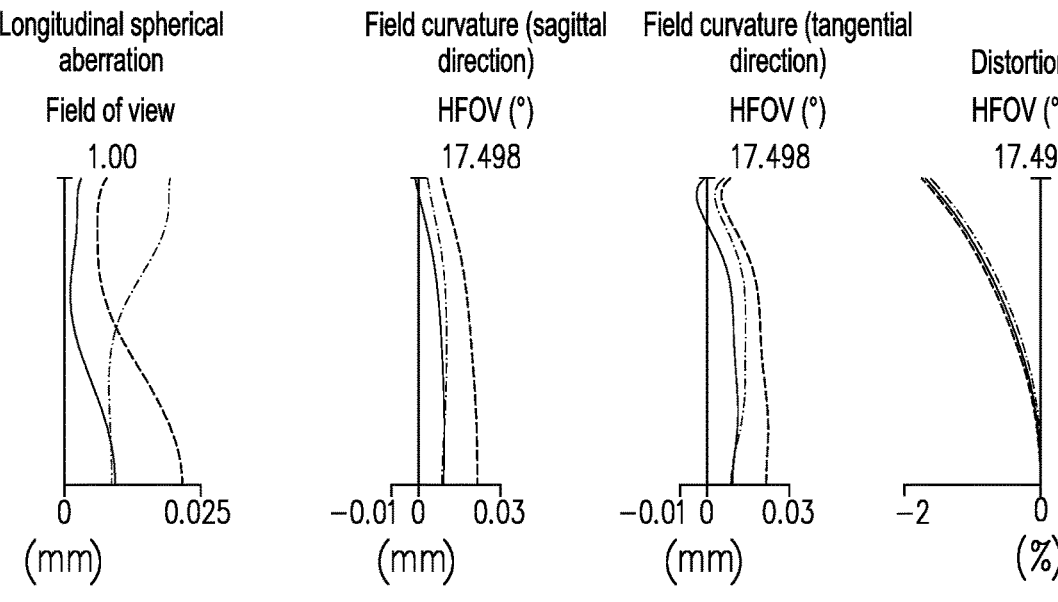
| Longitudinal spherical aberration | Field curvature (sagittal direction) | Field curvature (tangential direction) | Distortion |
|---|---|---|---|
| Field of view | HFOV (°) | HFOV (°) | HFOV (°) |
| 1.00 | 17.498 | 17.498 | 17.498 |
FIG. 27A    FIG. 27B    FIG. 27C    FIG. 27D
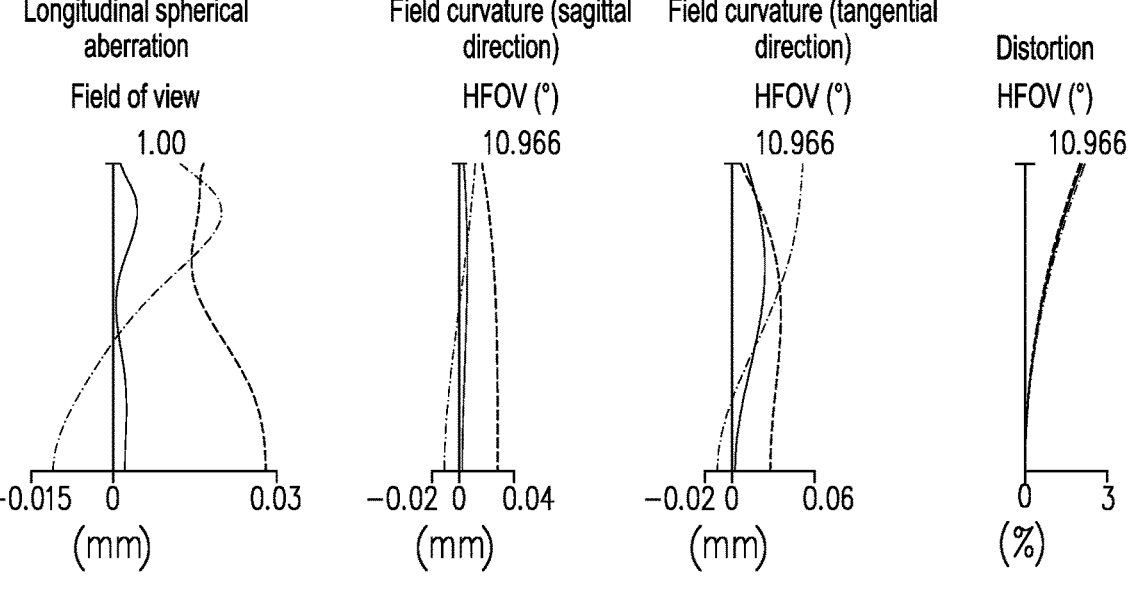
| Longitudinal spherical aberration | Field curvature (sagittal direction) | Field curvature (tangential direction) | Distortion |
|---|---|---|---|
| Field of view | HFOV (°) | HFOV (°) | HFOV (°) |
| 1.00 | 10.966 | 10.966 | 10.966 |
FIG. 27E    FIG. 27F    FIG. 27G    FIG. 27H

| Sixth embodiment | | | | | | |
|---|---|---|---|---|---|---|
| Short-focal-length (Wide-angle) | EFL=10.013 mm, Fno=2.151, HFOV=17.498°, ImgH=3.100 mm, TL=15.886 mm, BFL=2.129 mm, D1=3.778 mm, D2=2.435 mm, D3=1.604 mm | | | | | |
| Long-focal-length (Telephoto) | EFL=15.673 mm, Fno=3.367, HFOV=10.966°, ImgH=3.100 mm, TL=10.190 mm, BFL=6.767 mm D1=0.075 mm, D2=0.441 mm, D3=6.242 mm | | | | | |
| Device | Surface | Radius of curvature (mm) | Thickness (mm) | Refractive index | Abbe number | Focal length (mm) |
| Object | | Infinity | Infinity | | | |
| First lens element 1 | Object-side surface 15 | 10.273 | 1.058 | 1.588 | 28.433 | 13.976 |
| | Image-side surface 16 | -40.769 | 0.054 | | | |
| Second lens element 2 | Object-side surface 25 | 63.234 | 0.468 | 1.567 | 37.490 | -9.532 |
| Aperture 0 | Image-side surface 26 | 4.990 | D1 | | | |
| Third lens element 3 | Object-side surface 35 | 4.964 | 2.374 | 1.536 | 55.981 | 5.256 |
| | Image-side surface 36 | -35.612 | 0.469 | | | |
| Fourth lens element 4 | Object-side surface 45 | -29.247 | 0.485 | 1.671 | 19.243 | -13.094 |
| | Image-side surface 46 | 12.819 | 0.304 | | | |
| Fifth lens element 5 | Object-side surface 55 | 5.716 | 1.477 | 1.536 | 55.981 | 9.312 |
| | Image-side surface 56 | -37.302 | D2 | | | |
| Sixth lens element 6 | Object-side surface 65 | -8.214 | 1.862 | 1.671 | 19.243 | 20.133 |
| | Image-side surface 66 | -5.596 | 0.117 | | | |
| Seventh lens element 7 | Object-side surface 75 | 11.319 | 1.004 | 1.536 | 55.981 | -6.781 |
| | Image-side surface 76 | 2.676 | D3 | | | |
| Filter 9 | Object-side surface 95 | Infinity | 0.210 | 1.517 | 64.167 | |
| | Image-side surface 96 | Infinity | 0.314 | | | |
| | Image plane 99 | Infinity | | | | |

FIG. 28

| Surface | K | $a_4$ | $a_6$ | $a_8$ |
|---|---|---|---|---|
| 15 | -1.502539E+01 | -2.868534E-03 | -4.300419E-04 | 1.663792E-06 |
| 16 | 4.573529E+01 | -4.499829E-03 | -1.244987E-04 | -5.062089E-07 |
| 25 | -5.956607E+01 | 6.714071E-04 | -8.084953E-06 | 2.126408E-07 |
| 26 | -1.959527E+00 | 1.284432E-03 | -2.015756E-04 | 8.935263E-06 |
| 35 | -1.867991E+00 | 1.630297E-03 | -2.986467E-05 | 1.566221E-06 |
| 36 | 6.069852E+01 | -2.253326E-03 | 1.873870E-04 | -3.921747E-06 |
| 45 | -4.061923E+01 | 3.565496E-04 | 1.392527E-04 | 1.036973E-07 |
| 46 | 9.311023E+00 | 1.685796E-03 | 4.786429E-05 | 4.317636E-06 |
| 55 | -3.423731E+00 | 2.163270E-04 | -4.305330E-05 | -1.865914E-06 |
| 56 | 4.230074E+00 | 1.101562E-03 | -8.390395E-05 | 1.108484E-06 |
| 65 | -2.875756E+01 | 9.589731E-04 | 1.370101E-04 | -1.265904E-06 |
| 66 | -1.157019E+01 | -1.798757E-03 | 2.577369E-04 | -7.777718E-06 |
| 75 | -6.258160E+01 | -2.504640E-02 | 2.856481E-03 | -2.191425E-04 |
| 76 | -4.970013E+00 | -1.385291E-02 | 2.567268E-03 | -3.152124E-04 |
| Surface | $a_{10}$ | $a_{12}$ | $a_{14}$ | |
| 15 | 0.000000E+00 | 0.000000E+00 | 0.000000E+00 | |
| 16 | 0.000000E+00 | 0.000000E+00 | 0.000000E+00 | |
| 25 | 0.000000E+00 | 0.000000E+00 | 0.000000E+00 | |
| 26 | -3.736032E-07 | 0.000000E+00 | 0.000000E+00 | |
| 35 | -2.541178E-08 | 0.000000E+00 | 0.000000E+00 | |
| 36 | 5.411208E-09 | -8.110690E-10 | 0.000000E+00 | |
| 45 | -2.521519E-07 | -5.012200E-10 | 0.000000E+00 | |
| 46 | 5.859297E-07 | 0.000000E+00 | 0.000000E+00 | |
| 55 | 7.249574E-07 | 0.000000E+00 | 0.000000E+00 | |
| 56 | 5.404768E-08 | 1.244617E-09 | 0.000000E+00 | |
| 65 | 1.012376E-07 | 9.980870E-09 | -5.006530E-10 | |
| 66 | 1.137723E-07 | 2.700645E-08 | 2.238899E-09 | |
| 75 | 7.401936E-06 | 1.262642E-09 | 0.000000E+00 | |
| 76 | 2.739029E-05 | -1.608378E-06 | 4.827011E-08 | |

FIG. 29

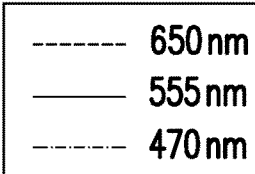
------- 650 nm
——— 555 nm
—·—·— 470 nm
Longitudinal spherical aberration
Field of view
1.00
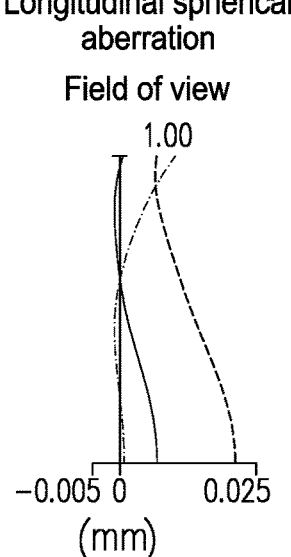
−0.005  0  0.025
(mm)
FIG. 31A
Field curvature (sagittal direction)
HFOV (°)
16.365
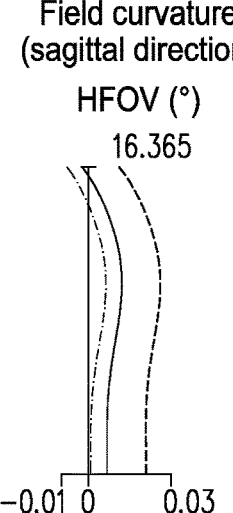
−0.01  0  0.03
(mm)
FIG. 31B
Field curvature (tangential direction)
HFOV (°)
16.365
−0.03  0  0.04
(mm)
FIG. 31C
Distortion
HFOV (°)
16.365
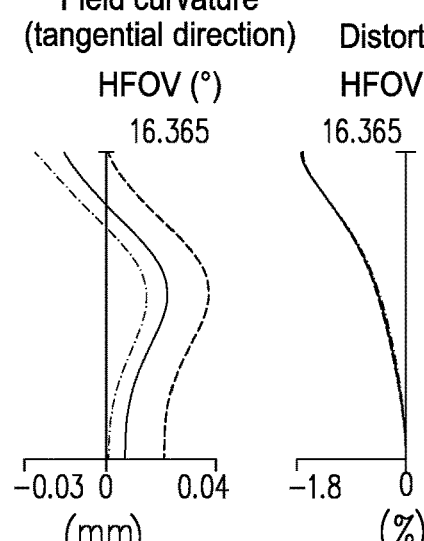
−1.8  0
(%)
FIG. 31D
Longitudinal spherical aberration
Field of view
1.00
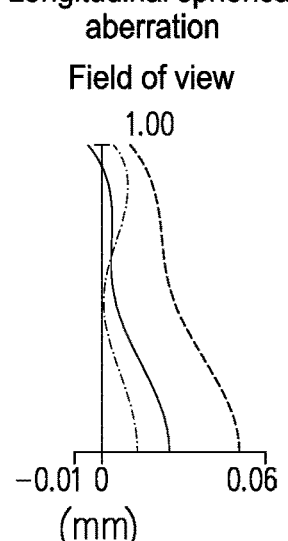
−0.01  0  0.06
(mm)
FIG. 31E
Field curvature (sagittal direction)
HFOV (°)
10.906
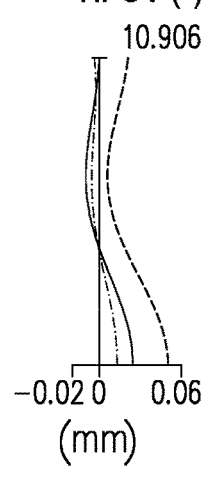
−0.02  0  0.06
(mm)
FIG. 31F
Field curvature (tangential direction)
HFOV (°)
10.906
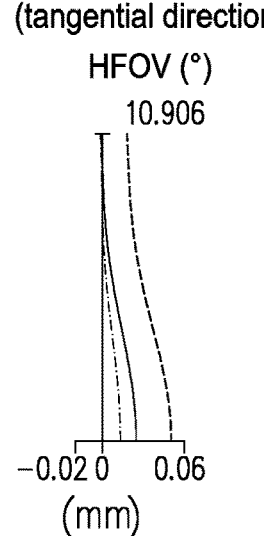
−0.02  0  0.06
(mm)
FIG. 31G
Distortion
HFOV (°)
10.906
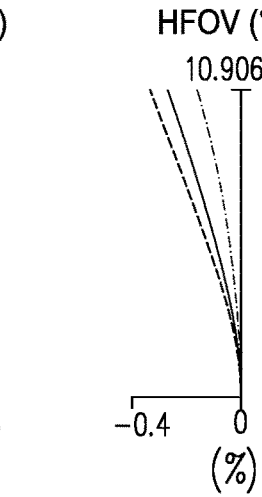
−0.4  0
(%)
FIG. 31H

| Seventh embodiment | | | | | | |
|---|---|---|---|---|---|---|
| Short-focal-length (Wide-angle) | EFL=10.730 mm, Fno=2.310, HFOV=16.365°, ImgH=3.100 mm, TL=15.722 mm, BFL=1.483 mm, D1=1.348 mm, D2=2.663 mm, D3=0.773 mm | | | | | |
| Long-focal-length (Telephoto) | EFL=16.166 mm, Fno=3.480, HFOV=10.906°, ImgH=3.100 mm, TL=13.102 mm, BFL=6.687 mm D1=1.243 mm, D2=0.148 mm, D3=5.977 mm | | | | | |
| Device | Surface | Radius of curvature (mm) | Thickness (mm) | Refractive index | Abbe number | Focal length (mm) |
| Object | | Infinity | Infinity | | | |
| First lens element 1 | Object-side surface 15 | 12.065 | 1.054 | 1.588 | 28.433 | 15.343 |
| | Image-side surface 16 | -35.490 | 0.060 | | | |
| Second lens element 2 | Object-side surface 25 | 83.145 | 0.604 | 1.567 | 37.490 | -11.299 |
| Aperture 0 | Image-side surface 26 | 5.961 | D1 | | | |
| Third lens element 3 | Object-side surface 35 | 5.907 | 2.566 | 1.536 | 55.981 | 9.473 |
| | Image-side surface 36 | -31.779 | 0.675 | | | |
| Fourth lens element 4 | Object-side surface 45 | -54.431 | 1.113 | 1.671 | 19.243 | -12.770 |
| | Image-side surface 46 | 10.372 | 1.269 | | | |
| Fifth lens element 5 | Object-side surface 55 | 5.295 | 1.509 | 1.536 | 55.981 | 8.404 |
| | Image-side surface 56 | -28.103 | D2 | | | |
| Sixth lens element 6 | Object-side surface 65 | -6.877 | 1.378 | 1.671 | 19.243 | 25.591 |
| | Image-side surface 66 | -5.322 | 0.213 | | | |
| Seventh lens element 7 | Object-side surface 75 | 17.932 | 1.270 | 1.536 | 55.981 | -6.782 |
| | Image-side surface 76 | 2.960 | D3 | | | |
| Filter 9 | Object-side surface 95 | Infinity | 0.210 | 1.517 | 64.167 | |
| | Image-side surface 96 | Infinity | 0.500 | | | |
| | Image plane 99 | Infinity | | | | |

FIG. 32

| Surface | K | $a_4$ | $a_6$ | $a_8$ |
|---|---|---|---|---|
| 15 | -2.425044E+01 | -1.889521E-03 | -3.688842E-04 | 8.586542E-06 |
| 16 | -2.134047E+01 | -3.965608E-03 | -2.327662E-05 | -4.302068E-07 |
| 25 | -7.866179E+01 | 7.954486E-04 | -1.182148E-05 | 1.370225E-07 |
| 26 | -1.948042E+00 | 1.104284E-03 | -2.163900E-04 | -1.655434E-06 |
| 35 | -3.476434E+00 | 5.486006E-04 | -9.420665E-05 | -2.077772E-06 |
| 36 | -8.032885E+00 | -2.832817E-03 | 8.021553E-05 | -1.276249E-05 |
| 45 | 8.771400E+01 | 4.869705E-04 | 7.769108E-05 | -5.653136E-06 |
| 46 | 3.942785E+00 | 1.124488E-03 | 8.635406E-05 | 5.835388E-06 |
| 55 | -3.339136E+00 | 1.786797E-04 | -7.495652E-05 | -2.973189E-07 |
| 56 | 5.383418E+01 | -3.752225E-04 | -1.280873E-04 | 4.793332E-06 |
| 65 | -2.392018E+01 | 1.833936E-03 | 1.421865E-04 | -4.974342E-07 |
| 66 | -1.035489E+01 | -5.133640E-04 | 2.708362E-04 | -1.623862E-07 |
| 75 | 1.413457E+01 | -2.700523E-02 | 3.060768E-03 | -2.291496E-04 |
| 76 | -5.459237E+00 | -1.308179E-02 | 2.440739E-03 | -3.223952E-04 |
| Surface | $a_{10}$ | $a_{12}$ | $a_{14}$ | |
| 15 | 0.000000E+00 | 0.000000E+00 | 0.000000E+00 | |
| 16 | 0.000000E+00 | 0.000000E+00 | 0.000000E+00 | |
| 25 | 0.000000E+00 | 0.000000E+00 | 0.000000E+00 | |
| 26 | 1.315762E-07 | 0.000000E+00 | 0.000000E+00 | |
| 35 | -9.826197E-07 | 0.000000E+00 | 0.000000E+00 | |
| 36 | -1.539807E-07 | 3.633520E-08 | 0.000000E+00 | |
| 45 | 3.629148E-08 | 3.207819E-08 | 0.000000E+00 | |
| 46 | -5.299881E-07 | 0.000000E+00 | 0.000000E+00 | |
| 55 | -1.759075E-07 | 0.000000E+00 | 0.000000E+00 | |
| 56 | -3.365656E-07 | 5.602088E-09 | 0.000000E+00 | |
| 65 | 3.212019E-08 | 2.495923E-09 | 0.000000E+00 | |
| 66 | 4.550257E-08 | 1.723624E-08 | 0.000000E+00 | |
| 75 | 8.438579E-06 | 1.532373E-08 | 0.000000E+00 | |
| 76 | 3.089207E-05 | -1.866685E-06 | 5.672959E-08 | |

FIG. 33

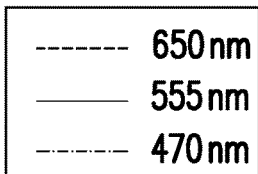
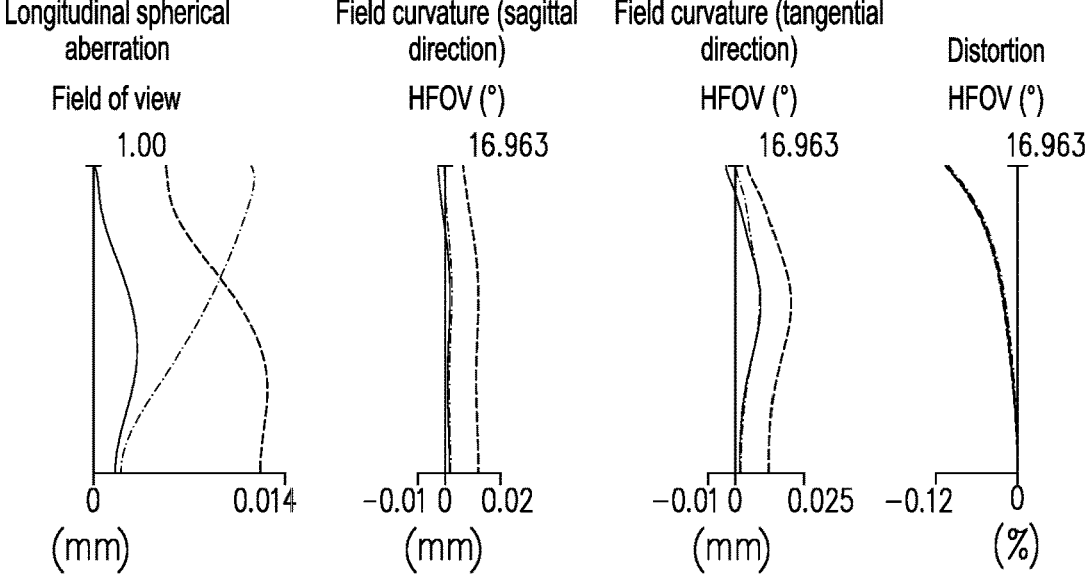
Longitudinal spherical aberration
Field of view
1.00
0    0.014
(mm)
FIG. 35A
Field curvature (sagittal direction)
HFOV (°)
16.963
−0.01 0  0.02
(mm)
FIG. 35B
Field curvature (tangential direction)
HFOV (°)
16.963
−0.01 0   0.025
(mm)
FIG. 35C
Distortion
HFOV (°)
16.963
−0.12    0
(%)
FIG. 35D
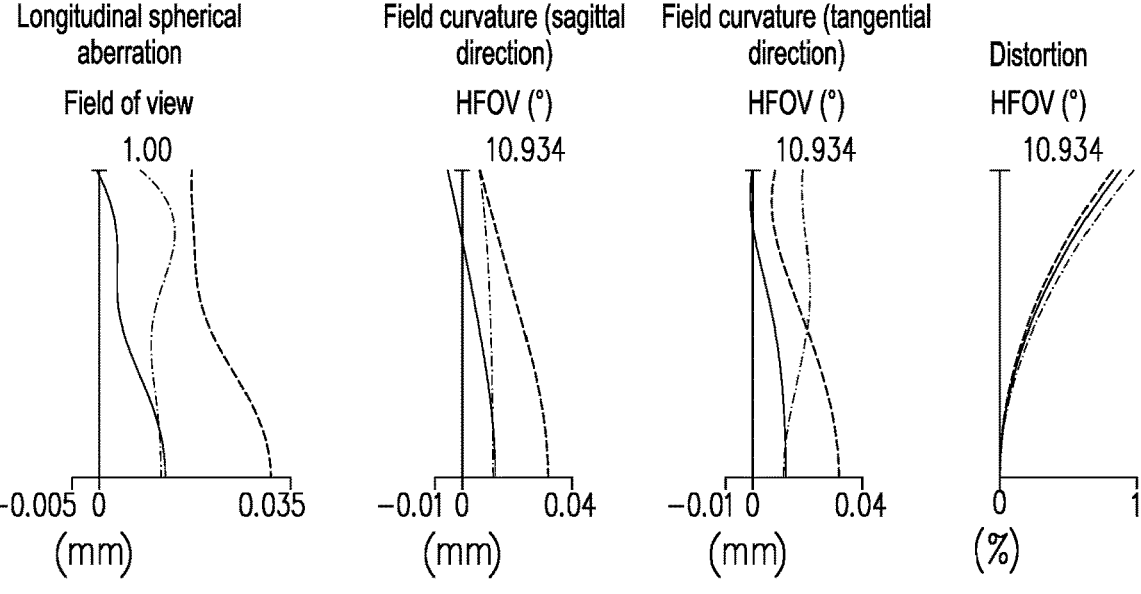
Longitudinal spherical aberration
Field of view
1.00
−0.005 0       0.035
(mm)
FIG. 35E
Field curvature (sagittal direction)
HFOV (°)
10.934
−0.01 0     0.04
(mm)
FIG. 35F
Field curvature (tangential direction)
HFOV (°)
10.934
−0.01 0     0.04
(mm)
FIG. 35G
Distortion
HFOV (°)
10.934
0         1
(%)
FIG. 35H

| Eighth embodiment | | | | | | |
|---|---|---|---|---|---|---|
| Short-focal-length (Wide-angle) | EFL=10.273 mm, Fno=2.195, HFOV=16.963°, ImgH=3.100 mm, TL=15.367 mm, BFL=1.450 mm, D1=2.028 mm, D2=2.780 mm, D3=0.740 mm | | | | | |
| Long-focal-length (Telephoto) | EFL=15.924 mm, Fno=3.403, HFOV=10.934°, ImgH=3.100 mm, TL=10.807 mm, BFL=6.839 mm D1=0.088 mm, D2=0.160 mm, D3=6.129 mm | | | | | |
| Device | Surface | Radius of curvature (mm) | Thickness (mm) | Refractive index | Abbe number | Focal length (mm) |
| Object | | Infinity | Infinity | | | |
| First lens element 1 | Object-side surface 15 | 11.599 | 1.225 | 1.588 | 28.433 | 14.856 |
| | Image-side surface 16 | -34.876 | 0.060 | | | |
| Second lens element 2 | Object-side surface 25 | 82.239 | 0.590 | 1.567 | 37.490 | -11.352 |
| Aperture 0 | Image-side surface 26 | 5.982 | D1 | | | |
| Third lens element 3 | Object-side surface 35 | 5.972 | 1.524 | 1.536 | 55.981 | 9.521 |
| | Image-side surface 36 | -33.081 | 0.723 | | | |
| Fourth lens element 4 | Object-side surface 45 | -55.721 | 0.470 | 1.671 | 19.243 | -12.927 |
| | Image-side surface 46 | 10.427 | 1.036 | | | |
| Fifth lens element 5 | Object-side surface 55 | 5.425 | 2.014 | 1.536 | 55.981 | 8.662 |
| | Image-side surface 56 | -29.009 | D2 | | | |
| Sixth lens element 6 | Object-side surface 65 | -6.735 | 1.380 | 1.671 | 19.243 | 26.874 |
| | Image-side surface 66 | -5.323 | 0.273 | | | |
| Seventh lens element 7 | Object-side surface 75 | 18.172 | 1.262 | 1.536 | 55.981 | -7.132 |
| | Image-side surface 76 | 3.094 | D3 | | | |
| Filter 9 | Object-side surface 95 | Infinity | 0.210 | 1.517 | 64.167 | |
| | Image-side surface 96 | Infinity | 0.500 | | | |
| | Image plane 99 | Infinity | | | | |

FIG. 36

| Surface | K | $a_4$ | $a_6$ | $a_8$ |
|---|---|---|---|---|
| 15 | -2.359617E+01 | -1.893184E-03 | -3.717818E-04 | 8.310808E-06 |
| 16 | -1.262206E+01 | -3.986720E-03 | -2.362571E-05 | -3.346307E-07 |
| 25 | -3.870527E+01 | 8.020694E-04 | -1.485638E-05 | -4.721263E-07 |
| 26 | -2.050543E+00 | 1.053865E-03 | -2.128607E-04 | -2.128070E-07 |
| 35 | -3.284070E+00 | 5.835762E-04 | -1.012528E-04 | -3.475629E-06 |
| 36 | -6.373009E+00 | -2.835507E-03 | 8.283066E-05 | -1.300195E-05 |
| 45 | 8.786939E+01 | 5.703745E-04 | 8.114381E-05 | -5.645957E-06 |
| 46 | 3.198234E+00 | 1.006971E-03 | 7.284782E-05 | 4.077192E-06 |
| 55 | -3.770277E+00 | 9.803661E-05 | -6.794419E-05 | 4.684938E-07 |
| 56 | 5.373615E+01 | -2.223898E-04 | -1.356171E-04 | 4.026937E-06 |
| 65 | -2.238140E+01 | 1.653782E-03 | 1.284105E-04 | -1.098886E-06 |
| 66 | -9.291268E+00 | -5.612658E-04 | 2.740640E-04 | -5.696207E-07 |
| 75 | 8.698039E+00 | -2.710115E-02 | 3.027840E-03 | -2.330041E-04 |
| 76 | -5.493362E+00 | -1.314423E-02 | 2.443890E-03 | -3.228056E-04 |

| Surface | $a_{10}$ | $a_{12}$ | $a_{14}$ |
|---|---|---|---|
| 15 | 0.000000E+00 | 0.000000E+00 | 0.000000E+00 |
| 16 | 0.000000E+00 | 0.000000E+00 | 0.000000E+00 |
| 25 | 0.000000E+00 | 0.000000E+00 | 0.000000E+00 |
| 26 | 3.972836E-07 | 0.000000E+00 | 0.000000E+00 |
| 35 | -1.072036E-06 | 0.000000E+00 | 0.000000E+00 |
| 36 | -2.995980E-07 | 9.179478E-09 | 0.000000E+00 |
| 45 | -6.565649E-09 | 1.810827E-08 | 0.000000E+00 |
| 46 | -7.794893E-07 | 0.000000E+00 | 0.000000E+00 |
| 55 | -1.512269E-07 | 0.000000E+00 | 0.000000E+00 |
| 56 | -3.330194E-07 | 1.133375E-08 | 0.000000E+00 |
| 65 | 0.000000E+00 | 0.000000E+00 | 0.000000E+00 |
| 66 | -6.862183E-08 | 0.000000E+00 | 0.000000E+00 |
| 75 | 8.084018E-06 | 0.000000E+00 | 0.000000E+00 |
| 76 | 3.074536E-05 | -1.889491E-06 | 5.439878E-08 |

FIG. 37

| Conditional expression | First embodiment | | Second embodiment | | Third embodiment | | Fourth embodiment | |
|---|---|---|---|---|---|---|---|---|
| | Wide-angle | Tele-photo | Wide-angle | Tele-photo | Wide-angle | Tele-photo | Wide-angle | Tele-photo |
| V1+V2+V6 | 124.915 | | 87.107 | | 110.482 | | 85.165 | |
| V1+V3+V4 | 105.598 | | 124.338 | | 105.631 | | 103.657 | |
| V2+V5+V6+V7 | 177.347 | | 168.694 | | 179.953 | | 168.694 | |
| Zoom ratio ft/fw | 1.497 | | 1.559 | | 1.500 | | 2.001 | |
| TTL/Tmax | 9.985 | 9.718 | 6.791 | 6.794 | 6.547 | 6.750 | 7.173 | 7.975 |
| AAG/Tmin | 15.297 | 5.817 | 14.912 | 4.029 | 15.300 | 5.407 | 15.300 | 2.979 |
| ALT/(T3+G34+T4) | 2.615 | 2.615 | 2.864 | 2.864 | 3.300 | 3.300 | 2.843 | 2.843 |
| (T1+G12+T2+G23+T3)/ T7 | 5.383 | 2.889 | 6.832 | 3.991 | 5.902 | 4.118 | 5.850 | 3.427 |
| TL/BFL | 6.914 | 1.830 | 9.654 | 1.730 | 10.115 | 1.763 | 7.976 | 1.182 |
| TTL/(T1+T7) | 9.102 | 8.858 | 9.195 | 9.199 | 7.751 | 7.992 | 8.076 | 8.980 |
| ALT/(Tmax+Tmin) | 3.808 | 3.808 | 3.095 | 3.095 | 2.918 | 2.918 | 3.277 | 3.277 |
| TL/ (T5+G56+T6+G67+T7) | 2.116 | 1.959 | 2.051 | 1.926 | 1.971 | 2.053 | 2.016 | 1.949 |
| (T6+G67+T7)/ (T1+G12+T2) | 2.401 | 2.401 | 2.367 | 2.367 | 2.302 | 2.302 | 2.408 | 2.408 |
| TTL/(AAG+BFL) | 1.921 | 1.971 | 2.142 | 2.141 | 2.084 | 2.018 | 2.142 | 1.921 |
| TTL/(T4+G45+T5) | 5.221 | 5.081 | 6.817 | 6.820 | 7.308 | 7.535 | 7.471 | 8.307 |
| Tmax/Tmin | 3.886 | 3.886 | 5.886 | 5.886 | 5.994 | 5.994 | 6.000 | 6.000 |
| (AAG+BFL)/Tavg | 2.825 | 7.686 | 1.661 | 6.487 | 1.412 | 5.857 | 1.927 | 8.812 |
| (T3+T6)/(T1+T2) | 2.669 | 2.669 | 3.604 | 3.604 | 2.788 | 2.788 | 3.221 | 3.221 |
| (T3+G34+T4+G45+T5)/ (T1+G12+T2) | 4.385 | 4.385 | 3.482 | 3.482 | 2.804 | 2.804 | 3.371 | 3.371 |
| ΔEFL/ΔBFL | 1.427 | | 1.212 | | 1.004 | | 1.603 | |
| ΔEFL/ΔAAG | 1.271 | | 1.214 | | 1.128 | | 2.230 | |
| ΔEFL/ΔGmax | 2.034 | | 2.072 | | 2.013 | | 4.132 | |
| Δ EFL (mm) | 6.940 | | 5.850 | | 4.463 | | 11.039 | |
| ΔGmax (mm) | 3.412 | | 2.824 | | 2.217 | | 2.672 | |
| ΔBFL (mm) | 4.862 | | 4.826 | | 4.445 | | 6.885 | |
| ΔAAG (mm) | 5.461 | | 4.819 | | 3.957 | | 4.951 | |

FIG. 38

| Conditional expression | Fifth embodiment | | Sixth embodiment | | Seventh embodiment | | Eighth embodiment | |
|---|---|---|---|---|---|---|---|---|
| | Wide-angle | Tele-photo | Wide-angle | Tele-photo | Wide-angle | Tele-photo | Wide-angle | Tele-photo |
| V1+V2+V6 | 85.165 | | 85.165 | | 85.165 | | 85.165 | |
| V1+V3+V4 | 103.657 | | 103.657 | | 103.657 | | 103.657 | |
| V2+V5+V6+V7 | 168.694 | | 168.694 | | 168.694 | | 168.694 | |
| Zoom ratio ft/fw | 1.510 | | 1.565 | | 1.507 | | 1.550 | |
| TTL/Tmax | 8.800 | 8.465 | 7.587 | 7.141 | 6.705 | 7.711 | 8.348 | 8.760 |
| AAG/Tmin | 15.291 | 2.939 | 15.280 | 3.118 | 10.306 | 5.970 | 14.669 | 4.976 |
| ALT/(T3+G34+T4) | 2.926 | 2.926 | 2.622 | 2.622 | 2.181 | 2.181 | 3.116 | 3.116 |
| (T1+G12+T2+G23+T3)/T7 | 6.156 | 3.415 | 7.700 | 4.013 | 4.434 | 4.352 | 4.299 | 2.762 |
| TL/BFL | 7.193 | 1.419 | 7.462 | 1.506 | 10.598 | 1.959 | 10.598 | 1.580 |
| TTL/(T1+T7) | 7.282 | 7.005 | 8.736 | 8.223 | 7.404 | 8.515 | 6.762 | 7.095 |
| ALT/(Tmax+Tmin) | 3.522 | 3.522 | 3.071 | 3.071 | 2.995 | 2.995 | 3.407 | 3.407 |
| TL/(T5+G56+T6+G67+T7) | 2.174 | 2.052 | 2.304 | 2.079 | 2.235 | 2.900 | 1.993 | 2.123 |
| (T6+G67+T7)/(T1+G12+T2) | 1.557 | 1.557 | 1.888 | 1.888 | 1.665 | 1.665 | 1.555 | 1.555 |
| TTL/(AAG+BFL) | 1.960 | 2.037 | 1.940 | 2.061 | 2.231 | 1.922 | 2.014 | 1.922 |
| TTL/(T4+G45+T5) | 8.792 | 8.458 | 7.951 | 7.484 | 4.422 | 5.086 | 4.776 | 5.012 |
| Tmax/Tmin | 4.476 | 4.476 | 5.069 | 5.069 | 4.247 | 4.247 | 4.282 | 4.282 |
| (AAG+BFL)/Tavg | 2.044 | 6.657 | 2.129 | 6.767 | 1.483 | 6.687 | 1.450 | 6.839 |
| (T3+T6)/(T1+T2) | 2.140 | 2.140 | 2.776 | 2.776 | 2.379 | 2.379 | 1.600 | 1.600 |
| (T3+G34+T4+G45+T5)/(T1+G12+T2) | 2.302 | 2.302 | 3.234 | 3.234 | 4.151 | 4.151 | 3.076 | 3.076 |
| ΔEFL/ΔBFL | 1.077 | | 1.220 | | 1.045 | | 1.049 | |
| ΔEFL/ΔAAG | 0.946 | | 0.994 | | 2.075 | | 1.239 | |
| ΔEFL/ΔGmax | 1.606 | | 1.529 | | 2.161 | | 2.157 | |
| ΔEFL (mm) | 4.968 | | 5.660 | | 5.435 | | 5.651 | |
| ΔGmax (mm) | 3.094 | | 3.702 | | 2.515 | | 2.620 | |
| ΔBFL (mm) | 4.613 | | 4.638 | | 5.203 | | 5.389 | |
| ΔAAG (mm) | 5.250 | | 5.697 | | 2.620 | | 4.560 | |

FIG. 39

OPTICAL IMAGING LENS

CROSS-REFERENCE TO RELATED APPLICATION

This application claims the priority benefit of Chinese application no. 202210111190.9, filed on Jan. 27, 2022. The entirety of the above-mentioned patent application is hereby incorporated by reference herein and made a part of this specification.

BACKGROUND

Technical Field

The disclosure relates to an optical device, and in particular to an optical imaging lens.

Description of Related Art

In recent years, optical imaging lenses have been continuously evolving, and have been applied in a wider range. In addition to requirements for light, thin, short, and small lenses, the design of a small F-number (Fno) facilitates an increase in the luminous flux, and a large field of view has gradually become a trend. Moreover, the requirements for video recording of portable electronic products are also increasing day by day. Optical zooming utilizing a single zoom lens or digital zooming achieved by combining multiple fixed-focus lenses can both meet different photographic needs. However, in a photographic system composed of multiple fixed-focus lenses, in addition to a relatively space-consuming arrangement of multiple lenses, when a focal length is adjusted during video recording, discontinuity in picture resolution or field of view may also be caused by different lenses. Therefore, how to design an optical imaging lens that is light, thin, short, and small, and also has a zoom effect is currently an issue to be addressed.

SUMMARY

The disclosure provides an optical imaging lens having a small F-number, a small volume, and favorable optical performance.

According to an embodiment of the disclosure, an optical imaging lens includes a first lens element, a second lens element, a third lens element, a fourth lens element, a fifth lens element, a sixth lens element, and a seventh lens element sequentially arranged along an optical axis from an object side to an image side. Each of the first lens element to the seventh lens element includes an object-side surface facing the object side and allowing an imaging ray to pass through and an image-side surface facing the image side and allowing the imaging ray to pass through. The second lens element has negative refracting power or the third lens element has positive refracting power. A periphery region of the object-side surface of the fourth lens element is convex. The fifth lens element has positive refracting power. The sixth lens element has positive refracting power. An optical axis region of the object-side surface of the seventh lens element is convex. Lens elements of the optical imaging lens are only the seven lens elements. The optical imaging lens has at least one adjustable air gap.

According to another embodiment of the disclosure, an optical imaging lens includes a first lens element, a second lens element, a third lens element, a fourth lens element, a fifth lens element, a sixth lens element, and a seventh lens element sequentially arranged along an optical axis from an object side to an image side. Each of the first lens element to the seventh lens element includes an object-side surface facing the object side and allowing an imaging ray to pass through and an image-side surface facing the image side and allowing the imaging ray to pass through. A periphery region of the object-side surface of the fourth lens element is convex. The fifth lens element has positive refracting power. The sixth lens element has positive refracting power. An optical axis region of the object-side surface of the seventh lens element is convex and a periphery region of the object-side surface of the seventh lens element is concave. Lens elements of the optical imaging lens are only the seven lens elements. The optical imaging lens has at least one adjustable air gap.

According to still another embodiment of the disclosure, an optical imaging lens includes a first lens element, a second lens element, a third lens element, a fourth lens element, a fifth lens element, a sixth lens element, and a seventh lens element sequentially arranged along an optical axis from an object side to an image side. Each of the first lens element to the seventh lens element includes an object-side surface facing the object side and allowing an imaging ray to pass through and an image-side surface facing the image side and allowing the imaging ray to pass through. The first lens element has positive refracting power and a periphery region of the image-side surface of the first lens element is convex. A periphery region of the object-side surface of the fourth lens element is convex. The fifth lens element has positive refracting power. The seventh lens element has negative refracting power and an optical axis region of the image-side surface of the seventh lens element is concave. Lens elements of the optical imaging lens are only the seven lens elements. The optical imaging lens has at least one adjustable air gap.

According to yet another embodiment of the disclosure, an optical imaging lens includes a first lens element, a second lens element, a third lens element, a fourth lens element, a fifth lens element, a sixth lens element, and a seventh lens element sequentially arranged along an optical axis from an object side to an image side. Each of the first lens element to the seventh lens element includes an object-side surface facing the object side and allowing an imaging ray to pass through and an image-side surface facing the image side and allowing the imaging ray to pass through. A periphery region of the image-side surface of the first lens element is convex. A periphery region of the image-side surface of the second lens element is concave. The third lens element has positive refracting power. The fifth lens element has positive refracting power. The seventh lens element has negative refracting power. An optical axis region of the image-side surface of the seventh lens element is concave. The optical imaging lens has at least an adjustable air gap. The first lens element has positive refracting power or the second lens element has negative refracting power or the sixth lens element has positive refracting power.

Based on the foregoing, in the optical imaging lens of the embodiments of the disclosure, by satisfying the above arrangement design of concave/convex curved surfaces of the lens elements, refracting power conditions, and adjustable air gap design, the optical imaging lens has a relatively small F-number and a relatively small volume, and still has good optical performance under different focal lengths.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 7A to FIG. 7H are diagrams of longitudinal spherical aberrations and various optical aberrations of the optical imaging lens of the first embodiment.

FIG. 8 shows detailed optical data of the optical imaging lens of the first embodiment of the disclosure.

FIG. 9 shows aspheric parameters of the optical imaging lens of the first embodiment of the disclosure.

FIG. 11A to FIG. 11H are diagrams of longitudinal spherical aberrations and various optical aberrations of the optical imaging lens of the second embodiment.

FIG. 12 shows detailed optical data of the optical imaging lens of the second embodiment of the disclosure.

FIG. 13 shows aspheric parameters of the optical imaging lens of the second embodiment of the disclosure.

FIG. 15A to FIG. 15H are diagrams of longitudinal spherical aberrations and various optical aberrations of the optical imaging lens of the third embodiment.

FIG. 16 shows detailed optical data of the optical imaging lens of the third embodiment of the disclosure.

FIG. 17 shows aspheric parameters of the optical imaging lens of the third embodiment of the disclosure.

FIG. 19A to FIG. 19H are diagrams of longitudinal spherical aberrations and various optical aberrations of the optical imaging lens of the fourth embodiment.

FIG. 20 shows detailed optical data of the optical imaging lens of the fourth embodiment of the disclosure.

FIG. 21 shows aspheric parameters of the optical imaging lens of the fourth embodiment of the disclosure.

FIG. 23A to FIG. 23H are diagrams of longitudinal spherical aberrations and various optical aberrations of the optical imaging lens of the fifth embodiment.

FIG. 24 shows detailed optical data of the optical imaging lens of the fifth embodiment of the disclosure.

FIG. 25 shows aspheric parameters of the optical imaging lens of the fifth embodiment of the disclosure.

FIG. 27A to FIG. 27H are diagrams of longitudinal spherical aberrations and various optical aberrations of the optical imaging lens of the sixth embodiment.

FIG. 28 shows detailed optical data of the optical imaging lens of the sixth embodiment of the disclosure.

FIG. 29 shows aspheric parameters of the optical imaging lens of the sixth embodiment of the disclosure.

FIG. 31A to FIG. 31H are diagrams of longitudinal spherical aberrations and various optical aberrations of the optical imaging lens of the seventh embodiment.

FIG. 32 shows detailed optical data of the optical imaging lens of the seventh embodiment of the disclosure.

FIG. 33 shows aspheric parameters of the optical imaging lens of the seventh embodiment of the disclosure.

FIG. 35A to FIG. 35H are diagrams of longitudinal spherical aberrations and
various optical aberrations of the optical imaging lens of the optical imaging lens.

FIG. 36 shows detailed optical data of the optical imaging lens of the eighth embodiment of the disclosure.

FIG. 37 shows aspheric parameters of the optical imaging lens of the eighth embodiment of the disclosure.

FIG. 38 shows values of relational expressions of important parameters of the optical imaging lenses of the first to fourth embodiments of the disclosure.

FIG. 39 shows values of relational expressions of important parameters of the optical imaging lenses of the fifth to eighth embodiments of the disclosure.

DESCRIPTION OF THE EMBODIMENTS

The terms "optical axis region". "periphery region". "concave", and "convex" used in this specification and claims should be interpreted based on the definition listed in the specification by the principle of lexicographer.

Figure 1:
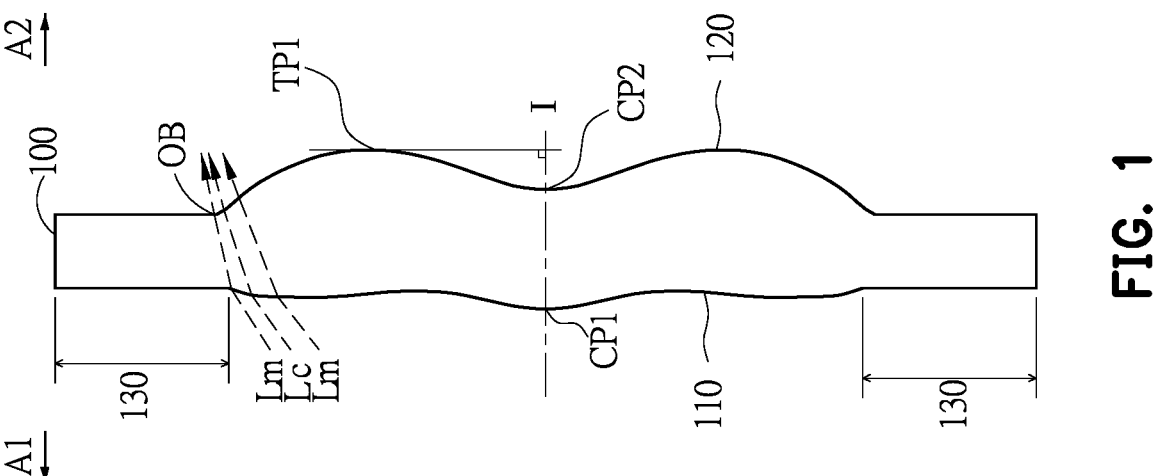
FIG. 1 is a schematic diagram showing a surface shape structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figures 3, 4, 5:
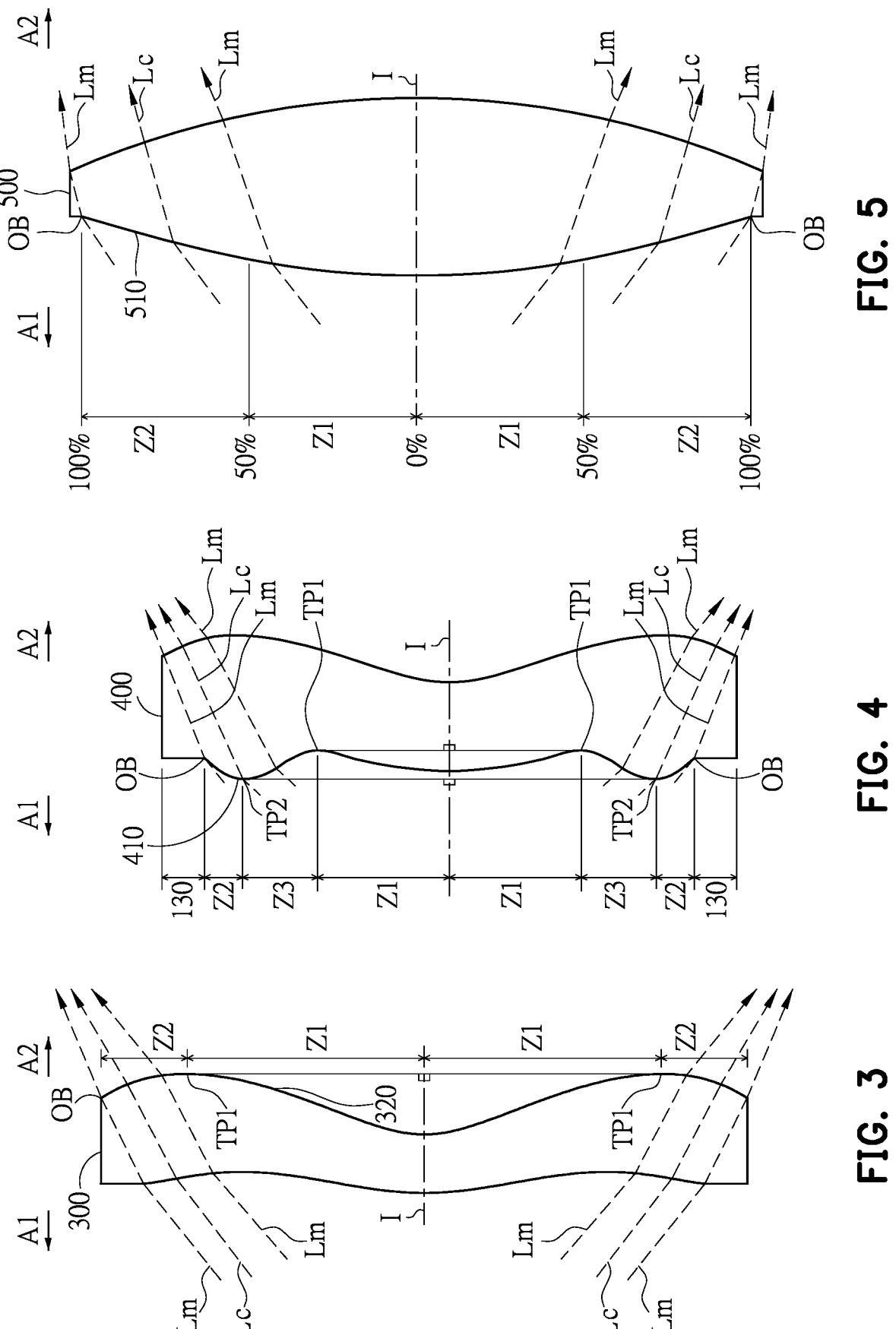
FIG. 3 is a schematic diagram showing a surface shape structure of a lens element of Example 1.
FIG. 4 is a schematic diagram showing a surface shape structure of a lens element of Example 2.
FIG. 5 is a schematic diagram showing a surface shape structure of a lens element of Example 3.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1. (closest to the optical axis I), the second transition point. e.g., TP2. (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
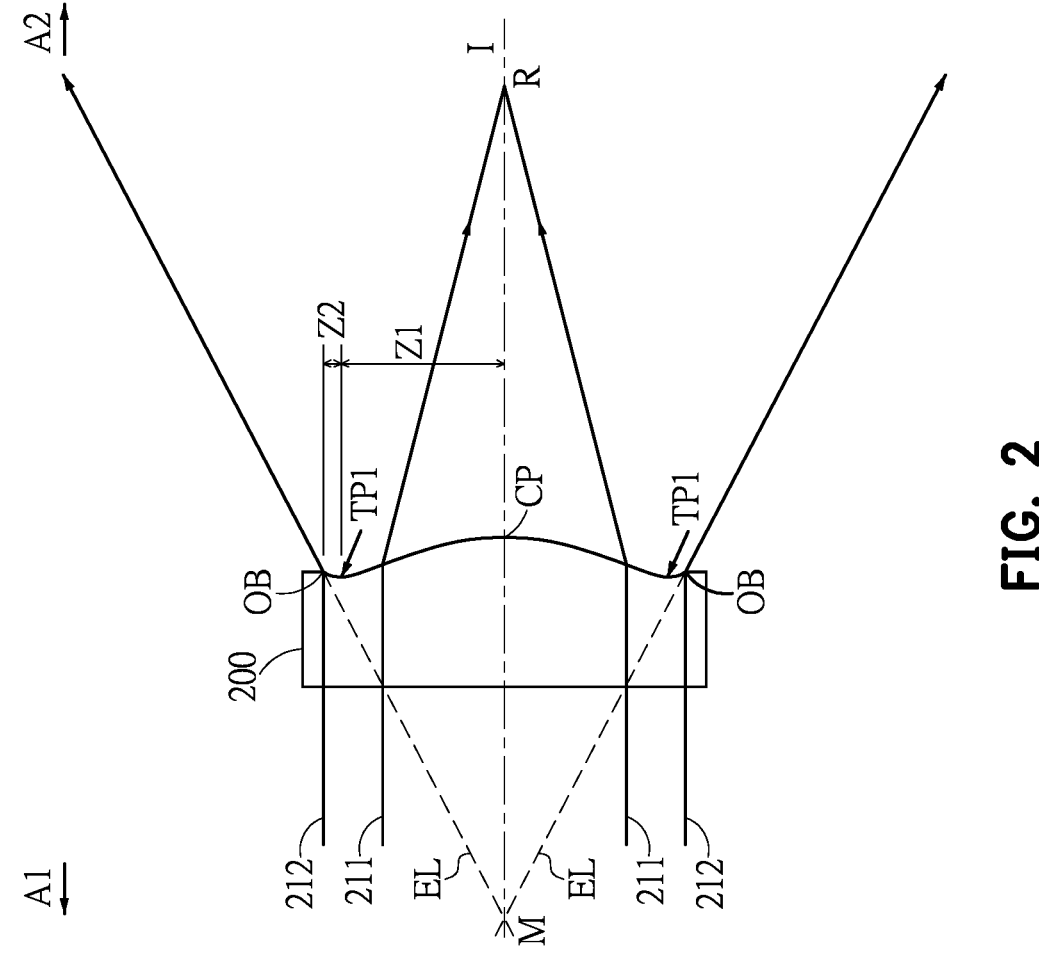
FIG. 2 is a schematic diagram showing a concave-convex structure and a point of intersection of rays of a lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1. i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)." "a region is convex (concave)." and "a convex-(concave-) region." can be used alternatively.

FIG. 3. FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4. a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
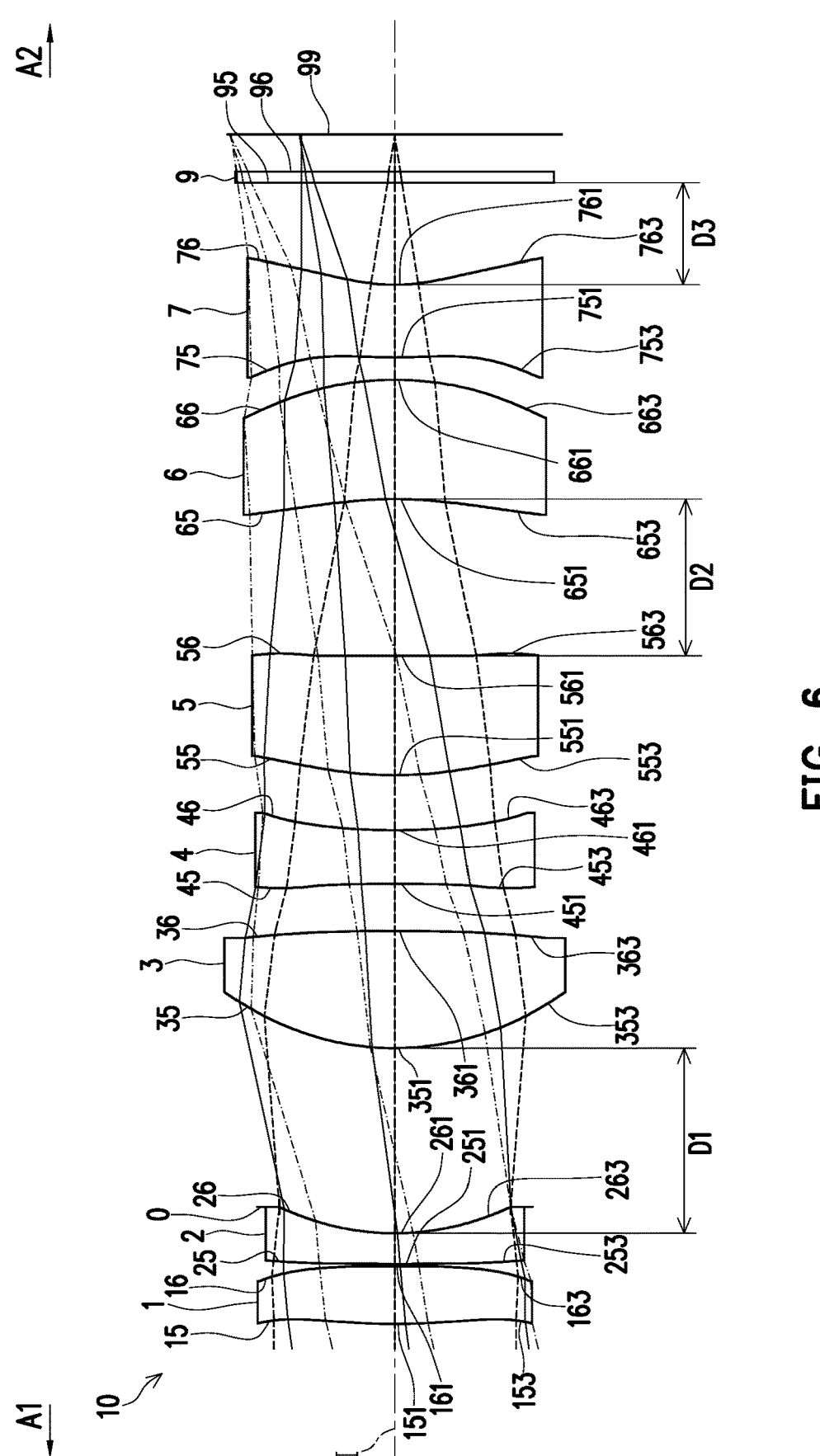
FIG. 6 is a schematic diagram of an optical imaging lens of a first embodiment of the disclosure.

FIG. 6 is a schematic diagram of an optical imaging lens of a first embodiment of the disclosure. FIG. 7A to FIG. 7H are diagrams of longitudinal spherical aberrations and various optical aberrations of the optical imaging lens of the first embodiment. First, referring to FIG. 6, an optical imaging lens 10 of the first embodiment of the disclosure includes the first lens element 1, the second lens element 2, an aperture 0, the third lens element 3, the fourth lens element 4, the fifth lens element 5, the sixth lens element 6, the seventh lens element 7, and a filter 9 sequentially arranged along the optical axis I of the optical imaging lens 10 from the object side A1 to the image side A2. When rays emitted by an object to be photographed enter the optical imaging lens 10, the rays may form an image on an image plane 99 after passing through the first lens element 1, the second lens element 2, the aperture 0, the third lens element 3, the fourth lens element 4, the fifth lens element 5, the sixth lens element 6, the seventh lens element 7, and the filter 9. The filter 9 is arranged between an image-side surface 76 of the seventh lens element 7 and the image plane 99. In addition, the object side A1 is a side facing the object to be photographed, and the image side A2 is a side facing the image plane 99. In this embodiment, the filter 9 is an IR cut filter.

In this embodiment, the first lens element 1, the second lens element 2, the third lens element 3, the fourth lens element 4, the fifth lens element 5, the sixth lens element 6, the seventh lens element 7, and the filter 9 of the optical imaging lens 10 respectively have object-side surfaces 15, 25, 35, 45, 55, 65, 75, 95 facing the object side A1 and allowing imaging rays to pass through and image-side surfaces 16, 26, 36, 46, 56, 66, 76, 96 facing the image side A2 and allowing the imaging rays to pass through. In this embodiment, the aperture 0 is arranged between the second lens element 2 and the third lens element 3.

The first lens element 1 has positive refracting power. An optical axis region 151 of the object-side surface 15 of the first lens element 1 is convex, and a periphery region 153 thereof is concave. An optical axis region 161 of the image-side surface 16 of the first lens element 1 is convex, and a periphery region 163 thereof is convex. In this embodiment, both the object-side surface 15 and the image-side surface 16 of the first lens element 1 are aspheric surfaces, but the disclosure is not limited thereto.

The second lens element 2 has negative refracting power. An optical axis region 251 of the object-side surface 25 of the second lens element 2 is convex, and a periphery region 253 thereof is convex. An optical axis region 261 of the image-side surface 26 of the second lens element 2 is concave, and a periphery region 263 thereof is concave. In this embodiment, both the object-side surface 25 and the image-side surface 26 of the second lens element 2 are aspheric surfaces, but the disclosure is not limited thereto.

The third lens element 3 has positive refracting power. An optical axis region 351 of the object-side surface 35 of the third lens element 3 is convex, and a periphery region 353 thereof is convex. An optical axis region 361 of the image-side surface 36 of the third lens element 3 is convex, and a periphery region 363 thereof is convex. In this embodiment, both the object-side surface 35 and the image-side surface 36 of the third lens element 3 are aspheric surfaces, but the disclosure is not limited thereto.

The fourth lens element 4 has negative refracting power. An optical axis region 451 of the object-side surface 45 of the fourth lens element 4 is concave, and a periphery region 453 thereof is convex. An optical axis region 461 of the image-side surface 46 of the fourth lens element 4 is concave, and a periphery region 463 thereof is concave. In this embodiment, both the object-side surface 45 and the image-side surface 46 of the fourth lens element 4 are aspheric surfaces, but the disclosure is not limited thereto.

The fifth lens element 5 has positive refracting power. An optical axis region 551 of the object-side surface 55 of the fifth lens element 5 is convex, and a periphery region 553 thereof is convex. An optical axis region 561 of the image-side surface 56 of the fifth lens element 5 is concave, and a periphery region 563 thereof is convex. In this embodiment, both the object-side surface 55 and the image-side surface 56 of the fifth lens element 5 are aspheric surfaces, but the disclosure is not limited thereto.

The sixth lens element 6 has positive refracting power. An optical axis region 651 of the object-side surface 65 of the sixth lens element 6 is concave, and a periphery region 653 thereof is concave. An optical axis region 661 of the image-side surface 66 of the sixth lens element 6 is convex, and a periphery region 663 thereof is convex. In this embodiment, both the object-side surface 65 and the image-side surface 66 of the sixth lens element 6 are aspheric surfaces, but the disclosure is not limited thereto.

The seventh lens element 7 has negative refracting power. An optical axis region 751 of the object-side surface 75 of the seventh lens element 7 is the convex, and a periphery region 753 thereof is the concave. An optical axis region 761 of the image-side surface 76 of the seventh lens element 7 is concave, and a periphery region 763 thereof is concave. In this embodiment, both the object-side surface 75 and the image-side surface 76 of the seventh lens element 7 are aspheric surfaces, but the disclosure is not limited thereto.

In this embodiment, lens elements of the optical imaging lens 10 are only the seven lens elements described above. In addition, the optical imaging lens 10 is a zoom lens. An air gap G23 between the second lens element 2 and the third lens element 3 on the optical axis I is an adjustable air gap D1, an air gap G56 between the fifth lens element 5 and the sixth lens element 6 on the optical axis I is an adjustable air gap D2, and an air gap G7F between the seventh lens element 7 and the filter 9 on the optical axis I is an adjustable air gap D3. Therefore, by changing distances between the adjustable air gaps D1, D2, and D3 in the optical imaging lens 10, a clear image can be formed when an effective focal length (EFL) of the optical imaging lens 10 falls within a range from 13.959 millimeters (mm) to 20.898 mm.

Other detailed optical data of the first embodiment are shown in FIG. 8. In addition, when the adjustable air gaps D1, D2, and D3 of the optical imaging lens 10 of the first embodiment are respectively 3.482 mm, 2.958 mm, and 1.916 mm, the optical imaging lens 10 is in a short-focal-length (wide-angle) mode, and has an effective focal length of 13.959 mm, an F-number (Fno) of 3.021, a half field of view (HFOV) of 12.831 degrees, and an image height of 3.100 mm. Moreover, a distance (e.g., TL in FIG. 8) from the object-side surface 15 of the first lens element 1 to the image-side surface 76 of the seventh lens element 7 on the optical axis I is 18.442 mm, a distance (e.g., BFL in FIG. 8) from the image-side surface 76 of the seventh lens element 7 to the image plane 99 on the optical axis I is 2.825 mm. Comparatively, when the adjustable air gaps D1, D2, and D3 of the optical imaging lens 10 of the first embodiment are respectively 0.071 mm, 0.908 mm, and 6.778 mm, the optical imaging lens 10 is in a long-focal-length (telephoto) mode, and has an effective focal length of 20.898 mm, an F-number of 4.524, a half field of view of 8.477 degrees, and an image height of 3.100 mm. Moreover, the distance from the object-side surface 15 of the first lens element 1 to the image-side surface 76 of the seventh lens element 7 on the optical axis I is 12.981 mm, and the distance from the image-side surface 76 of the seventh lens element 7 to the image plane 99 on the optical axis I is 7.686 mm.

Moreover, in this embodiment, a total of fourteen surfaces, i.e., the object-side surfaces 15, 25, 35, 45, 55, 65, 75 and the image-side surfaces 16, 26, 36, 46, 56, 66, 76 of the first lens element 1, the second lens element 2, the third lens element 3, the fourth lens element 4, the fifth lens element 5, the sixth lens element 6, and the seventh lens element 7 are all aspheric surfaces. The object-side surfaces 15, 25, 35, 45, 55, 65, 75 and the image-side surfaces 16, 26, 36, 46, 56, 66, and 76 are general even aspheric surfaces. These aspheric surfaces are defined according to Formula (1) below:

$$Z(Y) = \frac{Y^2}{R}\bigg/\left(1 + \sqrt{1 - (1+K)\frac{Y^2}{R^2}}\right) + \sum_{i=1}^{n} a_i \times Y^i, \qquad (1)$$

where
R: a radius of curvature at a position near the optical axis I on the surface of the lens element;
Z: a depth of an aspheric surface (a perpendicular distance between a point on the aspheric surface that is spaced by the distance Y from the optical axis and a tangent plane tangent to a vertex of the aspheric surface on the optical axis I);
Y: a perpendicular distance between a point on an aspheric curve and the optical axis I;
K: a conic constant; and
$a_i$: a $i^{th}$-order aspheric coefficient.

The aspheric coefficients of the object-side surface 15 of the first lens element 1 to the image-side surface 76 of the seventh lens element 7 in Formula (1) are as shown in FIG. 9. Field number 15 in FIG. 9 denotes an aspheric coefficient of the object-side surface 15 of the first lens element 1, and other fields may be deduced by analogy. In this embodiment and the following embodiments, the second-order aspheric coefficient $a_2$ of each aspheric surface is all zero.

In addition, the relationship between important parameters in the optical imaging lens of the first embodiment are as shown in FIG. 38.
where
T1 is a thickness of the first lens element 1 on the optical axis I;
T2 is a thickness of the second lens element 2 on the optical axis I;
T3 is a thickness of the third lens element 3 on the optical axis I;
T4 is a thickness of the fourth lens element 4 on the optical axis I;
T5 is a thickness of the fifth lens element 5 on the optical axis I;
T6 is a thickness of the sixth lens element 6 on the optical axis I;
T7 is a thickness of the seventh lens element 7 on the optical axis I;
G12 is a distance from the image-side surface 16 of the first lens element 1 to the object-side surface 25 of the second lens element 2 on the optical axis I, i.e., an air gap between the first lens element 1 and the second lens element 2 on the optical axis I;
G23 is a distance from the image-side surface 26 of the second lens element 2 to the object-side surface 35 of the third lens element 3 on the optical axis I. i.e., an air gap between the second lens element 2 and the third lens element 3 on the optical axis I;
G34 is a distance from the image-side surface 36 of the third lens element 3 to the object-side surface 45 of the fourth lens element 4 on the optical axis I. i.e., an air gap between the third lens element 3 and the fourth lens element 4 on the optical axis I;
G45 is a distance from the image-side surface 46 of the fourth lens element 4 to the object-side surface 55 of the fifth lens element 5 on the optical axis I. i.e., an air gap between the fourth lens element 4 and the fifth lens element 5 on the optical axis I;
G56 is a distance from the image-side surface 56 of the fifth lens element 5 to the object-side surface 65 of the sixth lens element 6 on the optical axis I. i.e., an air gap between the fifth lens element 5 and the sixth lens element 6 on the optical axis I;
G67 is a distance from the image-side surface 66 of the sixth lens element 6 to the object-side surface 75 of the seventh lens element 7 on the optical axis I. i.e., an air gap between the sixth lens element 6 and the seventh lens element 7 on the optical axis I;
AAG is a sum of the six air gaps between the first lens element 1 to the seventh lens element 7 on the optical axis I. i.e., a sum of the air gaps G12, G23, G34, G45, G56, and G67;

ALT is a sum of thicknesses of the seven lens elements from the first lens element 1 to the seventh lens element 7 on the optical axis I, i.e., a sum of the thicknesses T1, T2, T3. T4, T5. T6, and T7;

TL is a distance from the object-side surface 15 of the first lens element 1 to the image-side surface 76 of the seventh lens element 7 on the optical axis I;

TTL is a distance from the object-side surface 15 of the first lens element 1 to the image plane 99 on the optical axis I;

BFL is a distance from the image-side surface 76 of the seventh lens element 7 to the image plane 99 on the optical axis I;

EFL is an effective focal length of the optical imaging lens 10;

ft is an effective focal length of the optical imaging lens 10 in the long-focal-length (telephoto) mode;

fw is an effective focal length of optical imaging lens 10 in the short-focal-length (wide-angle) mode;

HFOV is a half field of view of the optical imaging lens 10;

ImgH is an image height of the optical imaging lens 10; and

Fno is an F-number of the optical imaging lens 10.

In addition, the following are further defined:

G7F is an air gap between the seventh lens element 7 and the filter 9 on the optical axis I;

TF is a thickness of the filter 9 on the optical axis I;

GFP is an air gap between the filter 9 and the image plane 99 on the optical axis I;

Tavg is an average value of the thicknesses of the seven lens elements from the first lens element 1 to the seventh lens element 7 on the optical axis I;

Tmax is a maximum value of the thicknesses of the seven lens elements from the first lens element 1 to the seventh lens element 7 on the optical axis I;

Tmin is a minimum value of the thicknesses of the seven lens elements from the first lens element 1 to the seventh lens element 7 on the optical axis I;

ΔGmax is a maximum value of changes in the air gaps between the first lens element 1 to the seventh lens element 7 on the optical axis I between the long-focal-length mode and the short-focal-length mode;

BFLt is a distance from the image-side surface 76 of the seventh lens element 7 to the image plane 99 on the optical axis I when the optical imaging lens 10 is in the long-focal-length mode, i.e., a back focal length of the optical imaging lens 10 in the long-focal-length mode;

BFLw is a distance from the image-side surface 76 of the seventh lens element 7 to the image plane 99 on the optical axis I when the optical imaging lens 10 is in the short-focal-length mode. i.e., a back focal length of the optical imaging lens 10 in the short-focal-length mode;

ΔBFL is a change in the back focal length of the optical imaging lens 10 between the long-focal-length mode and the short-focal-length mode;

AAGt is a sum of the six air gaps on the optical axis I of the optical imaging lens 10 in the long-focal-length mode;

AAGw is a sum of the six air gaps on the optical axis I of the optical imaging lens 10 in the short-focal-length mode;

ΔAAG is a change in the sum of the six air gaps on the optical axis I of the optical imaging lens 10 between the long-focal-length mode and the short-focal-length mode;

ΔEFL is a change in the effective focal length of the optical imaging lens 10 between the long-focal-length mode and the short-focal-length mode;

f1 is a focal length of the first lens element 1;

f2 is a focal length of the second lens element 2;

f3 is a focal length of the third lens element 3;

f4 is a focal length of the fourth lens element 4;

f5 is a focal length of the fifth lens element 5;

f6 is a focal length of the sixth lens element 6;

f7 is a focal length of the seventh lens element 7;

n1 is a refractive index of the first lens element 1;

n2 is a refractive index of the second lens element 2;

n3 is a refractive index of the third lens element 3;

n4 is a refractive index of the fourth lens element 4;

n5 is a refractive index of the fifth lens element 5;

n6 is a refractive index of the sixth lens element 6;

n7 is a refractive index of the seventh lens element 7;

V1 is an Abbe number of the first lens element 1, and the Abbe number may also be referred to as a dispersion coefficient;

V2 is an Abbe number of the second lens element 2;

V3 is an Abbe number of the third lens element 3;

V4 is an Abbe number of the fourth lens element 4;

V5 is an Abbe number of the fifth lens element 5;

V6 is an Abbe number of the sixth lens element 6; and

V7 is an Abbe number of the seventh lens element 7.

Then, reference may be made to FIG. 7A to FIG. 7H in conjunction. FIG. 7A and FIG. 7E are respectively diagrams showing longitudinal spherical aberrations on the image plane 99 at wavelengths of 470 nm. 555 nm, and 650 nm of the first embodiment in the long-focal-length mode and the short-focal-length mode. FIG. 7B and FIG. 7F are respectively diagrams showing field curvature aberrations in a sagittal direction on the image plane 99 at wavelengths of 470 nm. 555 nm, and 650 nm of the first embodiment in the long-focal-length mode and the short-focal-length mode. FIG. 7C and FIG. 7G are respectively diagrams showing field curvature aberrations in a tangential direction on the image plane 99 at wavelengths of 470 nm, 555 nm, and 650 nm of the first embodiment in the long-focal-length mode and the short-focal-length mode. FIG. 7D and FIG. 7H are respectively diagrams showing distortion aberrations on the image plane 99 at wavelengths of 470 nm. 555 nm, and 650 nm of the first embodiment in the long-focal-length mode and the short-focal-length mode. The longitudinal spherical aberrations of the first embodiment are as shown in FIG. 7A and FIG. 7E. Curves formed by the wavelengths are very close to each other and are close to the middle, which indicates that off-axis rays at different heights at each wavelength and are concentrated near an imaging point. As can be seen from the deflection amplitude of the curve at each wavelength, deviations of imaging points of the off-axis rays at different heights are controlled within a range of +0.4 mm. Therefore, in the first embodiment, the spherical aberration of the same wavelength is obviously improved. In addition, distances between the three representative wavelengths are also quite close to each other, which indicates that imaging positions of rays at different wavelengths are quite concentrated, so the chromatic aberration is also obviously improved.

In the four diagrams of FIG. 7B. FIG. 7C. FIG. 7F, and FIG. 7G showing field curvature aberrations, changes in focal lengths of the three representative wavelengths within the entire field of view fall within +0.4 mm, which indicates that the optical system of the first embodiment can effectively alleviate the optical aberrations. The distortion aberration diagrams of FIG. 7D and FIG. 7H show that the distortion aberrations of this embodiment are maintained within a range of +3%, which indicates that the distortion aberrations of the first embodiment meet the imaging quality requirements of the optical system. It is accordingly indicated that, compared with an existing optical lens, the first embodiment can still provide good imaging quality. Thus, the first embodiment can have a relatively small F-number and a relatively small volume, and still have good optical performance under different focal lengths in a case where good optical performance maintained.

Figure 10:
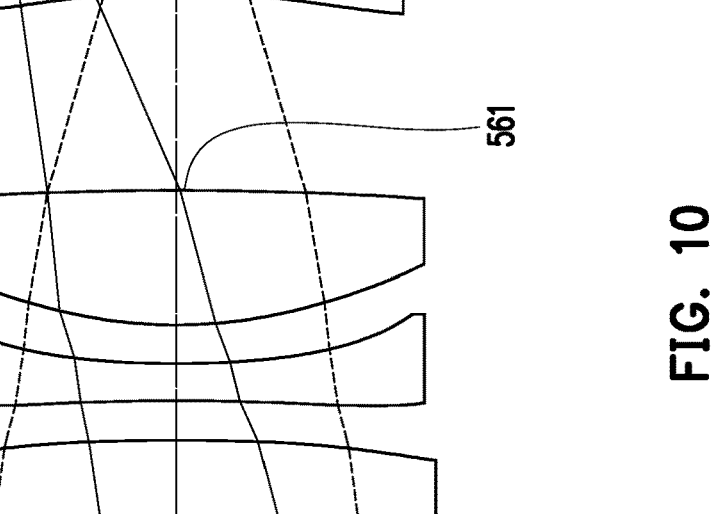
FIG. 10 is a schematic diagram of an optical imaging lens of a second embodiment of the disclosure.

FIG. 10 is a schematic diagram of an optical imaging lens of a second embodiment of the disclosure. FIG. 11A to FIG. 11H are diagrams of longitudinal spherical aberrations and various optical aberrations of the optical imaging lens of the second embodiment. First, referring to FIG. 10, the second embodiment of the optical imaging lens 10 of the disclosure is approximately similar to the first embodiment, and their differences are as follows: the optical data, aspheric coefficients, and parameters among the lens elements 1, 2. 3, 4. 5, 6, and 7 are more or less different. In addition, in this embodiment, the fourth lens element 4 has positive refracting power. The optical axis region 561 of the image-side surface 56 of the fifth lens element 5 is convex. The periphery region 663 of the image-side surface 66 of the sixth lens element 6 is concave. It should be noted here that, in order to clearly show the figure, the reference numerals of the optical axis region and the periphery region with similar surface shapes to those of the first embodiment are partially omitted in FIG. 10.

Detailed optical data of the optical imaging lens 10 of the second embodiment are as shown in FIG. 12. In addition, when the adjustable air gaps D1, D2, and D3 of the optical imaging lens 10 of the second embodiment are respectively 2.884 mm, 2.467 mm, and 1.274 mm, the optical imaging lens 10 is in a short-focal-length mode, and has an effective focal length of 10.459 mm, an F-number of 2.239, a half field of view of 16.679 degrees, and an image height of 3.100 mm. Moreover, the distance from the object-side surface 15 of the first lens element 1 to the image-side surface 76 of the seventh lens element 7 on the optical axis I is 16.038 mm, and the distance from the image-side surface 76 of the seventh lens element 7 to the image plane 99 on the optical axis I is 1.661 mm. Comparatively, when the adjustable air gaps D1, D2, and D3 of the optical imaging lens 10 of the second embodiment are respectively 0.060 mm. 0.472 mm, and 6.100 mm, the optical imaging lens 10 is in a long-focal-length mode, and has an effective focal length of 16.309 mm, an F-number of 3.491, a half field of view of 10.636 degrees, and an image height of 3.100 mm. Moreover, the distance from the object-side surface of the first lens element 1 to the image-side surface 76 of the seventh lens element 7 on the optical axis I is 11.219 mm, and the distance from the image-side surface 76 of the seventh lens element 7 to the image plane 99 on the optical axis I is 6.487 mm.

As shown in FIG. 13. FIG. 13 shows the aspheric coefficients of the object-side surface 15 of the first lens element 1 to the image-side surface 76 of the seventh lens element 7 of the second embodiment in Formula (1) above.

In addition, the relationships between the important parameters in the optical imaging lens 10 of the second embodiment are as shown in FIG. 38.

The longitudinal spherical aberrations of the second embodiment respectively in the long-focal-length mode and the short-focal-length mode are as shown in FIG. 11A and FIG. 11E, and deviations of imaging points of off-axis rays at different heights are controlled within a range of +0.14 mm. In the four diagrams of FIG. 11B, FIG. 11C, FIG. 11F, and FIG. 11G showing field curvature aberrations respectively in the long-focal-length mode and the short-focal-length mode, changes in focal lengths of the three representative wavelengths within the entire field of view fall within +0.14 mm. The diagrams of FIG. 11D and FIG. 11H showing distortion aberrations in the long-focal-length mode and the short-focal-length mode show that the distortion aberrations of this embodiment are maintained within a range of +2%.

As can be known from the above description, the F-number of the second embodiment is smaller than the F-number of the first embodiment. Therefore, compared with the first embodiment, the second embodiment has a greater amount of light admitted. In addition, the longitudinal spherical aberrations of the second embodiment are smaller than the longitudinal spherical aberrations of the first embodiment, the field curvature aberrations of the second embodiment are smaller than the field curvature aberrations of the first embodiment, and the distortion aberration of the second embodiment are smaller than the distortion aberrations of the first embodiment.

Figure 14:
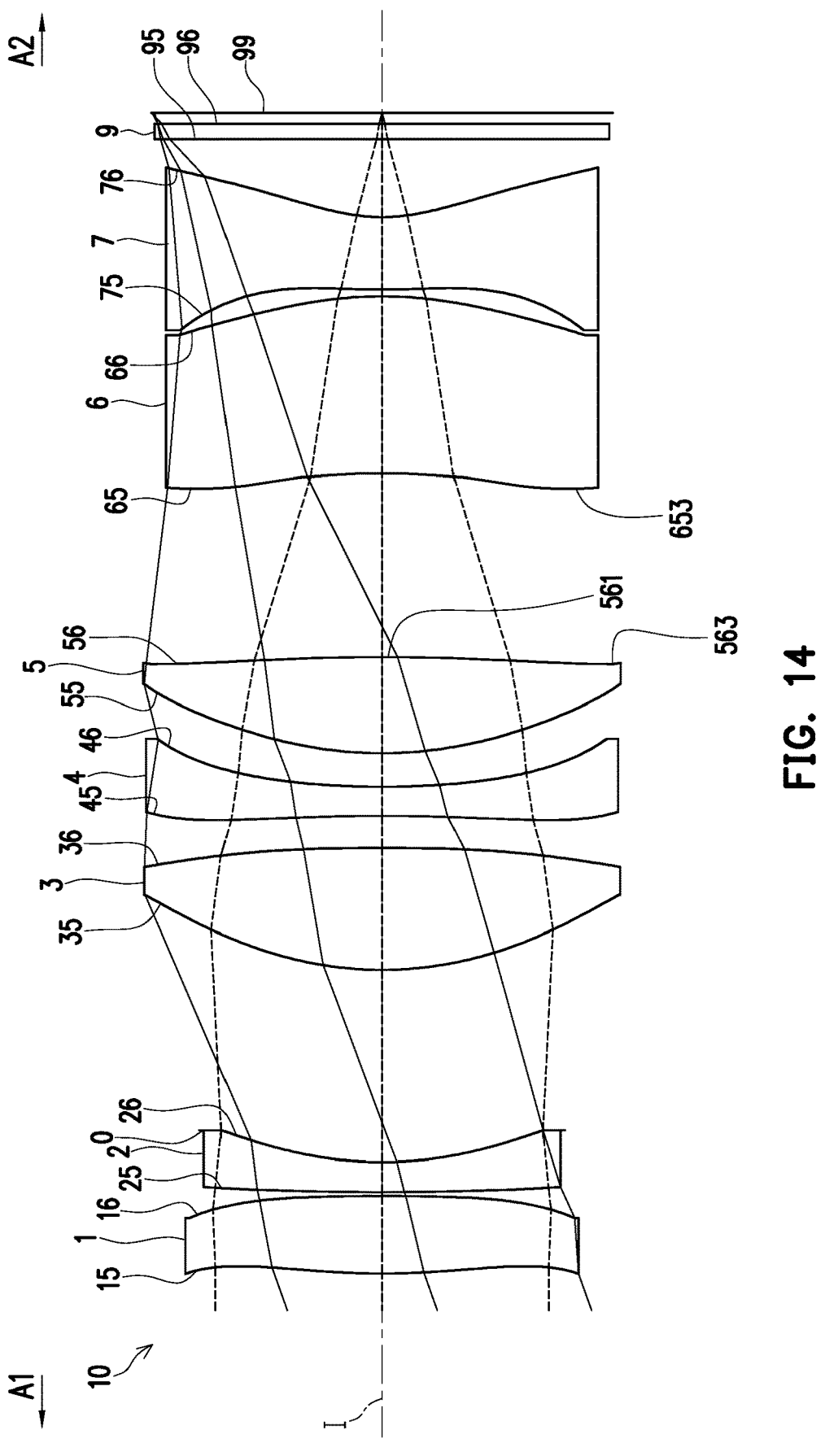
FIG. 14 is a schematic diagram of an optical imaging lens of a third embodiment of the disclosure.

FIG. 14 is a schematic diagram of an optical imaging lens of a third embodiment of the disclosure. FIG. 15A to FIG. 15H are diagrams of longitudinal spherical aberrations and various optical aberrations of the optical imaging lens of the third embodiment. First, referring to FIG. 14, the third embodiment of the optical imaging lens 10 of the disclosure is approximately similar to the first embodiment, and their differences are as follows: the optical data, aspheric coefficients, and parameters among the lens elements 1, 2, 3, 4. 5, 6, and 7 are more or less different. In addition, in this embodiment, the optical axis region 561 of the image-side surface 56 of the fifth lens element 5 is convex. The periphery region 563 of the image-side surface 56 of the fifth lens element 5 is concave. The periphery region 653 of the object-side surface 65 of the sixth lens element 6 is convex. It should be noted here that, in order to clearly show the figure, the reference numerals of the optical axis region and the periphery region with similar surface shapes to those of the first embodiment are partially omitted in FIG. 14.

Detailed optical data of the optical imaging lens 10 of the third embodiment are as shown in FIG. 16. In addition, when the adjustable air gaps D1, D2, and D3 of the optical imaging lens 10 of the third embodiment are respectively 2.605 mm. 2.486 mm, and 1.056 mm, the optical imaging lens 10 is in a short-focal-length mode, and has an effective focal length of 8.927 mm, an F-number of 1.927, a half field of view of 19.539 degrees, and an image height of 3.100 mm. Moreover, the distance from the object-side surface 15 of the first lens element 1 to the image-side surface 76 of the seventh lens element 7 on the optical axis I is 14.284 mm, and the distance from the image-side surface 76 of the seventh lens element 7 to the image plane 99 on the optical axis I is 1.412 mm. Comparatively, when the adjustable air gaps D1, D2, and D3 of the optical imaging lens 10 of the third embodiment are respectively 0.866 mm. 0.269 mm, and 5.502 mm, the optical imaging lens 10 is in a long-focal-length mode, and has an effective focal length of 13.390 mm, an F-number of 2.891, a half field of view of 12.842 degrees, and an image height of 3.100 mm. Moreover, the distance from the object-side surface 15 of the first lens element 1 to the image-side surface 76 of the seventh lens element 7 on the optical axis I is 10.327 mm, and the distance from the image-side surface 76 of the seventh lens element 7 to the image plane 99 on the optical axis I is 5.857 mm.

As shown in FIG. 17. FIG. 17 shows the aspheric coefficients of the object-side surface 15 of the first lens element 1 to the image-side surface 76 of the seventh lens element 7 of the third embodiment in Formula (1) above.

In addition, the relationships between the important parameters in the optical imaging lens 10 of the third embodiment are as shown in FIG. 38.

The longitudinal spherical aberrations of the third embodiment respectively in the long-focal-length mode and the short-focal-length mode are as shown in FIG. 15A and FIG. 15E, and deviations of imaging points of off-axis rays at different heights are controlled within a range of ±0.06 mm. In the four diagrams of FIG. 15B. FIG. 15C, FIG. 15F, and FIG. 15G showing field curvature aberrations respectively in the long-focal-length mode and the short-focal-length mode, changes in focal lengths of the three representative wavelengths within the entire field of view fall within ±0.06 mm. The diagrams of FIG. 15D and FIG. 15H showing distortion aberrations in the long-focal-length mode and the short-focal-length mode show that the distortion aberrations of this embodiment are maintained within a range of ±2.5%.

As can be known from the above description, the F-number of the third embodiment is smaller than the F-number of the first embodiment. Therefore, compared with the first embodiment, the third embodiment has a greater amount of light admitted. In addition, the longitudinal spherical aberrations of the third embodiment are smaller than the longitudinal spherical aberrations of the first embodiment, the field curvature aberrations of the third embodiment are smaller than the field curvature aberrations of the first embodiment, and the distortion aberrations of the third embodiment are smaller than the distortion aberrations of the first embodiment.

Figure 18:
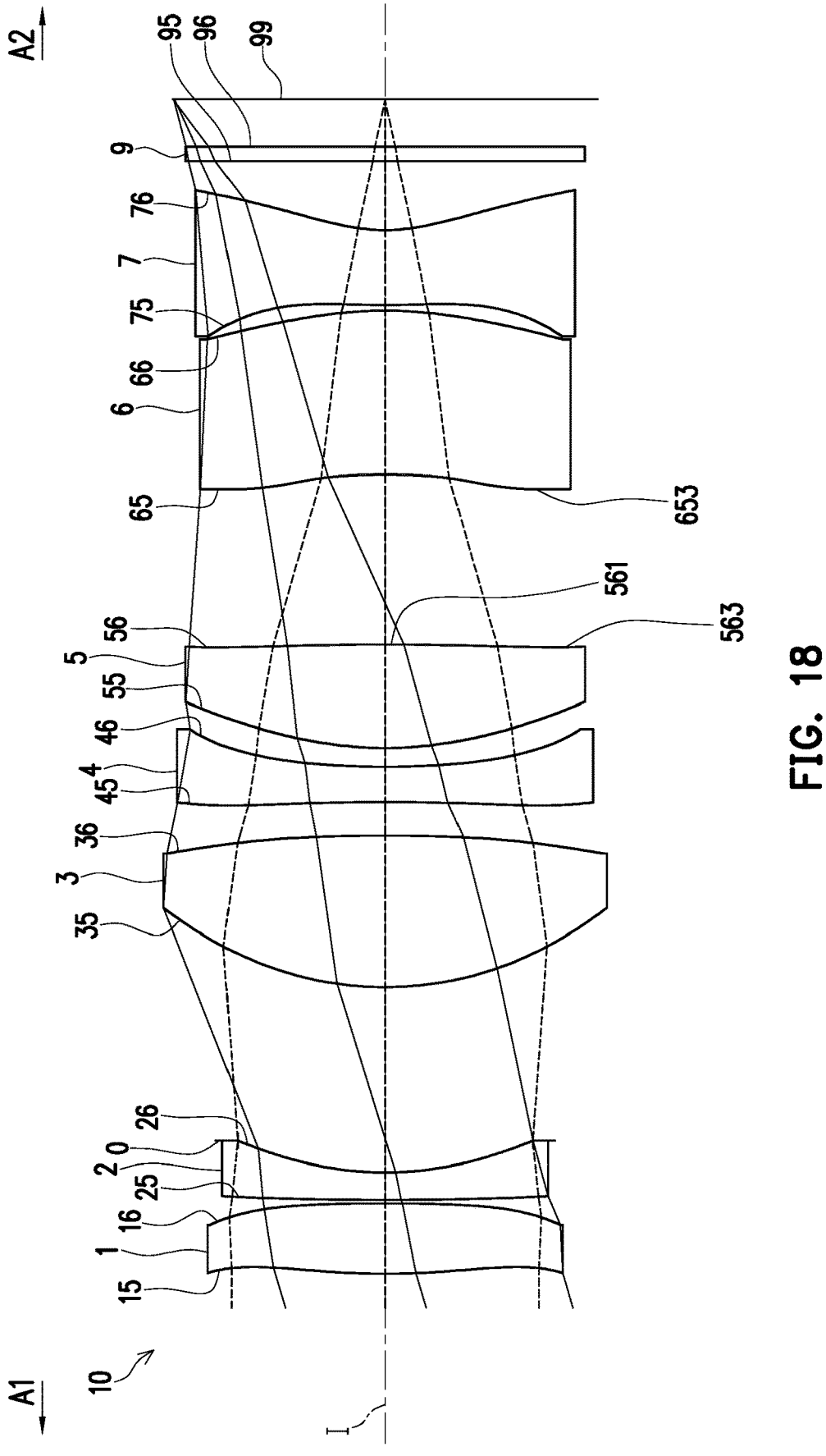
FIG. 18 is a schematic diagram of an optical imaging lens of a fourth embodiment of the disclosure.

FIG. 18 is a schematic diagram of an optical imaging lens of a fourth embodiment of the disclosure. FIG. 19A to FIG. 19H are diagrams of longitudinal spherical aberrations and various optical aberrations of the optical imaging lens of the fourth embodiment. First, referring to FIG. 18, the fourth embodiment of the optical imaging lens 10 of the disclosure is approximately similar to the first embodiment, and their differences are as follows: the optical data, aspheric coefficients, and parameters among the lens elements 1, 2, 3, 4, 5, 6, and 7 are more or less different. In addition, in this embodiment, the optical axis region 561 of the image-side surface 56 of the fifth lens element 5 is convex. The periphery region 563 of the image-side surface 56 of the fifth lens element 5 is concave. The periphery region 653 of the object-side surface 65 of the sixth lens element 6 is convex. It should be noted here that, in order to clearly show the figure, the reference numerals of the optical axis region and the periphery region with similar surface shapes to those of the first embodiment are partially omitted in FIG. 18.

Detailed optical data of the optical imaging lens 10 of the fourth embodiment are as shown in FIG. 20. In addition, when the adjustable air gaps D1, D2, and D3 of the optical imaging lens 10 of the fourth embodiment are respectively 2.727 mm. 2.505 mm and 1.015 mm, the optical imaging lens 10 is in a short-focal-length mode, and has an effective focal length of 11.029 mm, an F-number of 2.385, a half field of view of 16.466 degrees, and an image height of 3.100 mm. Moreover, the distance from the object-side surface 15 of the first lens element 1 to the image-side surface 76 of the seventh lens element 7 on the optical axis I is 15.368 mm, and the distance from the image-side surface 76 of the seventh lens element 7 to the image plane 99 on the optical axis I is 1.927 mm. Comparatively, when the adjustable air gaps D1, D2, and D3 of the optical imaging lens 10 of the fourth embodiment are respectively 0.055 mm. 0.225 mm, and 7.900 mm, the optical imaging lens 10 is in a long-focal-length mode, and has an effective focal length of 22.069 mm, an F-number of 4.771, a half field of view of 8.871 degrees, and an image height of 3.100 mm. Moreover, the distance from the object-side surface 15 of the first lens element 1 to the image-side surface 76 of the seventh lens element 7 on the optical axis I is 10.416 mm, and the distance from the image-side surface 76 of the seventh lens element 7 to the image plane 99 on the optical axis I is 8.812 mm.

As shown in FIG. 21, FIG. 21 shows the aspheric coefficients of the object-side surface 15 of the first lens element 1 to the image-side surface 76 of the seventh lens element 7 of the fourth embodiment in Formula (1) above.

In addition, the relationships between the important parameters in the optical imaging lens 10 of the fourth embodiment are as shown in FIG. 38.

The longitudinal spherical aberrations of the fourth embodiment respectively in the long-focal-length mode and the short-focal-length mode are as shown in FIG. 19A and FIG. 19E, and deviations of imaging points of off-axis rays at different heights are controlled within a range of ±1.6 mm. In the four diagrams of FIG. 19B, FIG. 19C, FIG. 19F, and FIG. 19G showing field curvature aberrations respectively in the long-focal-length mode and the short-focal-length mode, changes in focal lengths of the three representative wavelengths within the entire field of view fall within ±1.6 mm. The diagrams of FIG. 19D and FIG. 19H showing distortion aberrations in the long-focal-length mode and the short-focal-length mode show that the distortion aberrations of this embodiment are maintained within a range of ±2%.

As can be known from the above description, the zoom ratio of the fourth embodiment is greater than the zoom ratio of the first embodiment. Therefore, compared with the first embodiment, the fourth embodiment has a greater range of focal lengths possible for photographing. In addition, the distortion aberrations of the fourth embodiment are smaller than the distortion aberrations of the first embodiment.

Figure 22:
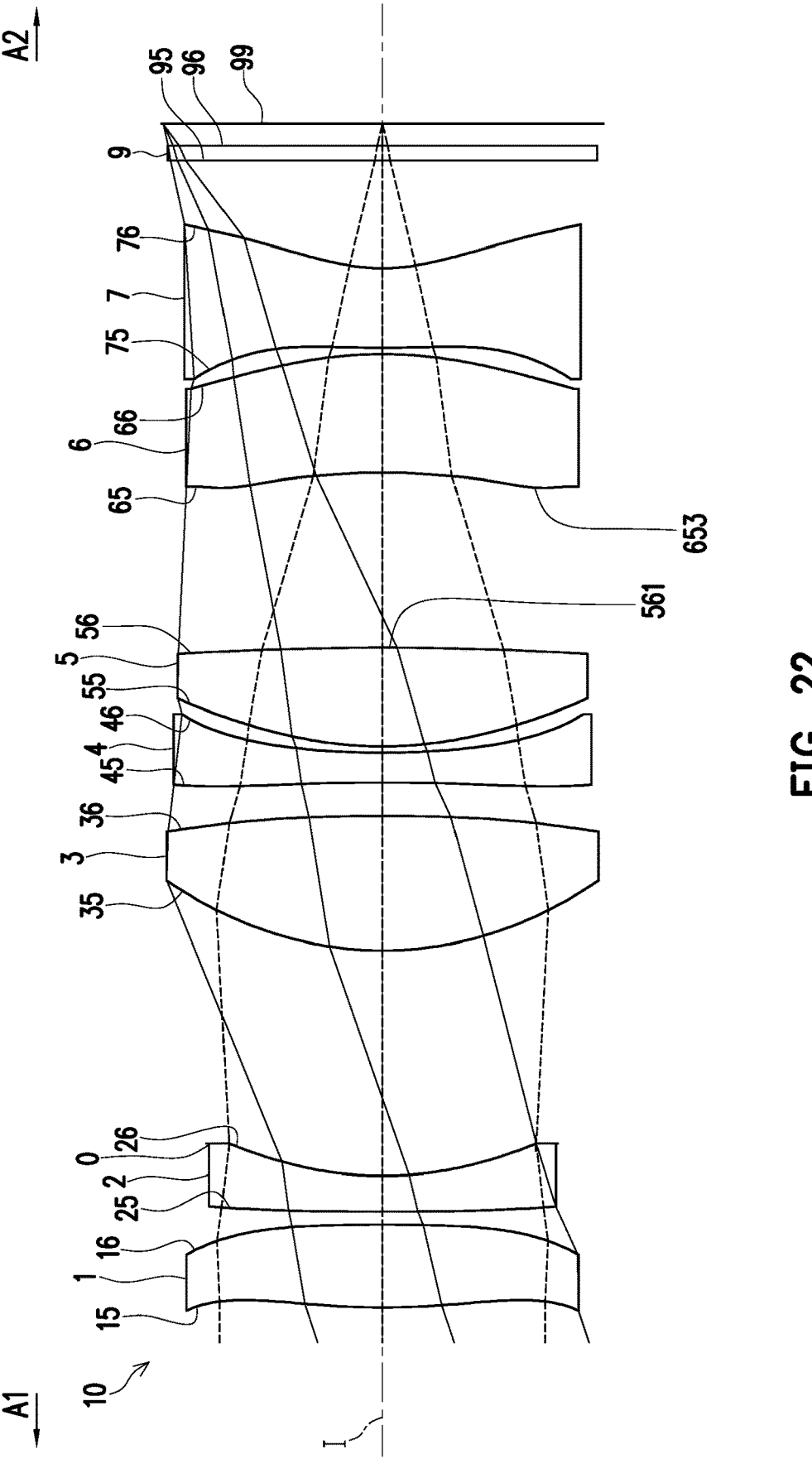
FIG. 22 is a schematic diagram of an optical imaging lens of a fifth embodiment of the disclosure.

FIG. 22 is a schematic diagram of an optical imaging lens of a fifth embodiment of the disclosure. FIG. 23A to FIG. 23H are diagrams of longitudinal spherical aberrations and various optical aberrations of the optical imaging lens of the fifth embodiment. First, referring to FIG. 22, the fifth embodiment of the optical imaging lens 10 of the disclosure is approximately similar to the first embodiment, and their differences are as follows: the optical data, aspheric coefficients, and parameters among the lens elements 1, 2, 3, 4, 5, 6, and 7 are more or less different. In addition, in this embodiment, the optical axis region 561 of the image-side surface 56 of the fifth lens element 5 is convex. The periphery region 653 of the object-side surface 65 of the sixth lens element 6 is convex. It should be noted here that, in order to clearly show the figure, the reference numerals of the optical axis region and the periphery region with similar surface shapes to those of the first embodiment are partially omitted in FIG. 22.

Detailed optical data of the optical imaging lens 10 of the fifth embodiment are as shown in FIG. 24. In addition, when the adjustable air gaps D1, D2, and D3 of the optical imaging lens 10 of the fifth embodiment are respectively 3.187 mm. 2.475 mm, and 1.521 mm, the optical imaging lens 10 is in a short-focal-length mode, and has an effective focal length of 9.740 mm, an F-number of 2.056, a half field of view of 18.251 degrees, and an image height of 3.100 mm. Moreover, the distance from the object-side surface 15 of the first lens element 1 to the image-side surface 76 of the seventh lens element 7 on the optical axis I is 14.698 mm, and the distance from the image-side surface 76 of the seventh lens element 7 to the image plane 99 on the optical axis I is 2.044 mm. Comparatively, when the adjustable air gaps D1, D2, and D3 of the optical imaging lens 10 of the fifth embodiment are respectively 0.093 mm. 0.319 mm, and 6.135 mm, the optical imaging lens 10 is in a long-focal-length mode, and has an effective focal length of 14.708 mm, an F-number of 3.105, a half field of view of 11.585 degrees, and an image height of 3.100 mm. Moreover, the distance from the object-side surface 15 of the first lens element 1 to the image-side surface 76 of the seventh lens element 7 on the optical axis I is 9.448 mm, and the distance from the image-side surface 76 of the seventh lens element 7 to the image plane 99 on the optical axis I is 6.657 mm.

As shown in FIG. 25. FIG. 25 shows the aspheric coefficients of the object-side surface 15 of the first lens element 1 to the image-side surface 76 of the seventh lens element 7 of the fifth embodiment in Formula (1) above.

In addition, the relationships between the important parameters in the optical imaging lens 10 of the fifth embodiment are as shown in FIG. 39.

The longitudinal spherical aberrations of the fifth embodiment respectively in the long-focal-length mode and the short-focal-length mode are as shown in FIG. 23A and FIG. 23E, and deviations of imaging points of off-axis rays at different heights are controlled within a range of +0.1 mm. In the four diagrams of FIG. 23B. FIG. 23C, FIG. 23F, and FIG. 23G showing field curvature aberrations respectively in the long-focal-length mode and the short-focal-length mode, changes in focal lengths of the three representative wavelengths within the entire field of view fall within +0.25 mm. The diagrams of FIG. 23D and FIG. 23H showing distortion aberrations in the long-focal-length mode and the short-focal-length mode show that the distortion aberrations of this embodiment are maintained within a range of +4%.

As can be known from the above description, the F-number of the fifth embodiment is smaller than the F-number of the first embodiment. Therefore, compared with the first embodiment, the fifth embodiment has a greater amount of light admitted. In addition, the longitudinal spherical aberrations of the fifth embodiment are smaller than the longitudinal spherical aberrations of the first embodiment, and the field curvature aberrations of the fifth embodiment are smaller than the field curvature aberrations of the first embodiment.

Figure 26:
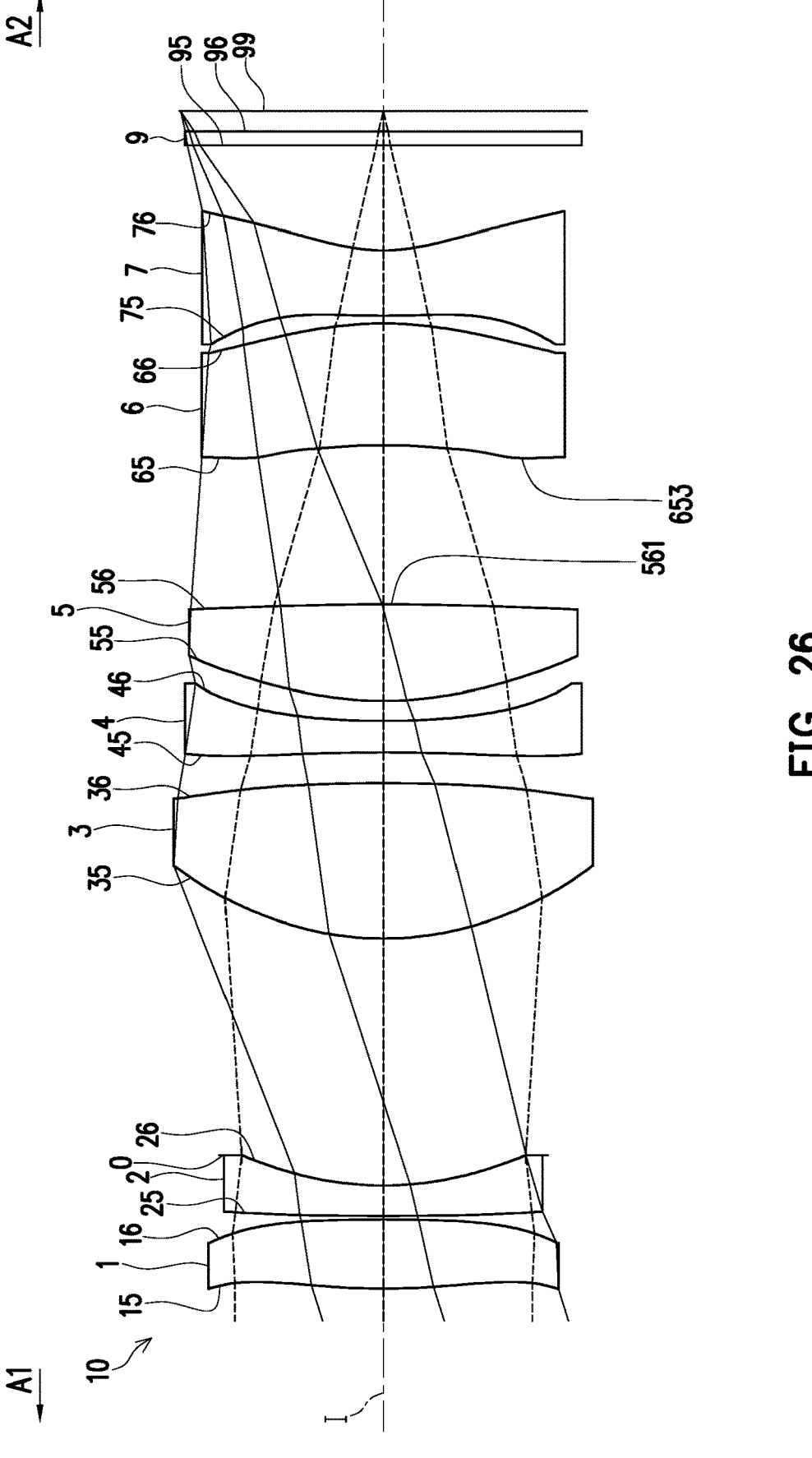
FIG. 26 is a schematic diagram of an optical imaging lens of a sixth embodiment of the disclosure.

FIG. 26 is a schematic diagram of an optical imaging lens of a sixth embodiment of the disclosure. FIG. 27A to FIG. 27H are diagrams of longitudinal spherical aberrations and various optical aberrations of the optical imaging lens of the sixth embodiment. First, referring to FIG. 26, the sixth embodiment of the optical imaging lens 10 of the disclosure is approximately similar to the first embodiment, and their differences are as follows: the optical data, aspheric coefficients, and parameters among the lens elements 1, 2, 3. 4. 5, 6, and 7 are more or less different. In addition, in this embodiment, the optical axis region 561 of the object-side surface 65 of the sixth lens element 6 is convex. It should be noted here that, in order to clearly show the figure, the reference numerals of the optical axis region and the periphery region with similar surface shapes to those of the first embodiment are partially omitted in FIG. 26.

Detailed optical data of the optical imaging lens 10 of the sixth embodiment are as shown in FIG. 28. In addition, when the adjustable air gaps D1, D2, and D3 of the optical imaging lens 10 of the sixth embodiment are respectively 3.778 mm. 2.435 mm, and 1.604 mm, the optical imaging lens 10 is in a short-focal-length mode, and has an effective focal length of 10.013 mm, an F-number of 2.151, a half field of view of 17.498 degrees, and an image height of 3.100 mm. Moreover, the distance from the object-side surface 15 of the first lens element 1 to the image-side surface 76 of the seventh lens element 7 on the optical axis I is 15.886 mm, and the distance from the image-side surface 76 of the seventh lens element 7 to the image plane 99 on the optical axis I is 2.129 mm. Comparatively, when the adjustable air gaps D1, D2, and D3 of the optical imaging lens 10 of the sixth embodiment are respectively 0.075 mm. 0.441 mm, and 6.242 mm, the optical imaging lens 10 is in a long-focal-length mode, and has an effective focal length of 15.673 mm, an F-number of 3.367, a half field of view of 10.966 degrees, and an image height of 3.100 mm. Moreover, the distance from the object-side surface 15 of the first lens element 1 to the image-side surface 76 of the seventh lens element 7 on the optical axis I is 10.190 mm, and the distance from the image-side surface 76 of the seventh lens element 7 to the image plane 99 on the optical axis I is 6.767 mm.

As shown in FIG. 29, FIG. 29 shows the aspheric coefficients of the object-side surface 15 of the first lens element 1 to the image-side surface 76 of the seventh lens element 7 of the sixth embodiment in Formula (1) above.

In addition, the relationships between the important parameters in the optical imaging lens 10 of the sixth embodiment are as shown in FIG. 39.

The longitudinal spherical aberrations of the sixth embodiment respectively in the long-focal-length mode and the short-focal-length mode are as shown in FIG. 27A and FIG. 27E, and deviations of imaging points of off-axis rays at different heights are controlled within a range of +0.03 mm. In the four diagrams of FIG. 27B. FIG. 27C, FIG. 27F, and FIG. 27G showing field curvature aberrations respectively in the long-focal-length mode and the short-focal-length mode, changes in focal lengths of the three representative wavelengths within the entire field of view fall within +0.06 mm. The diagrams of FIG. 27D and FIG. 27H showing distortion aberrations in the long-focal-length mode and the short-focal-length mode show that the distortion aberrations of this embodiment are maintained within a range of +2.5%.

As can be known from the above description, the F-number of the sixth embodiment is smaller than the F-number of the first embodiment. Therefore, compared with the first embodiment, the sixth embodiment has a greater amount of light admitted. In addition, the longitudinal spherical aberrations of the sixth embodiment are smaller than the longitudinal spherical aberrations of the first embodiment, the field curvature aberrations of the sixth embodiment are smaller than the field curvature aberrations of the first embodiment, and the distortion aberrations of the sixth embodiment are smaller than the distortion aberrations of the first embodiment.

Figure 30:
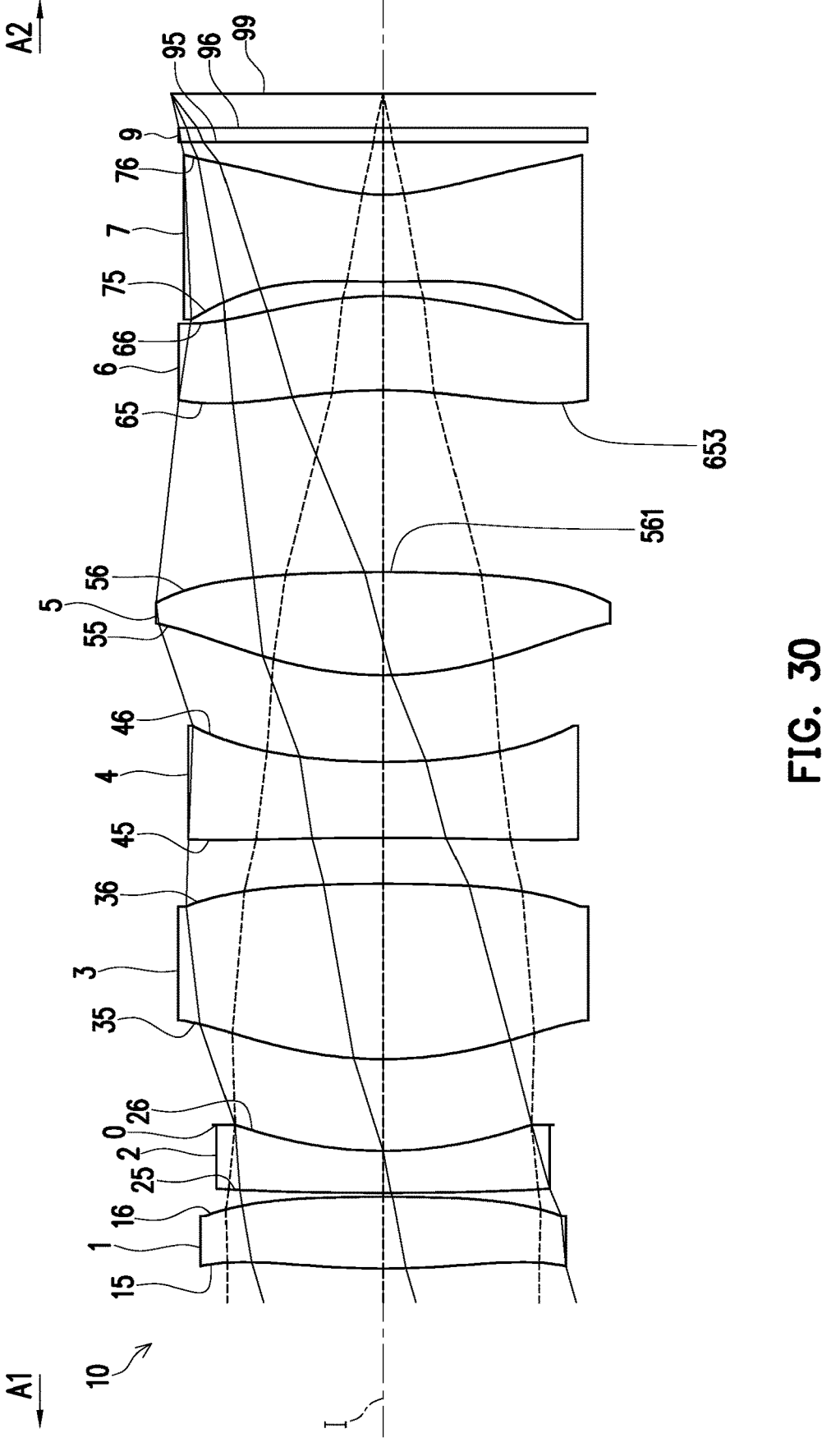
FIG. 30 is a schematic diagram of an optical imaging lens of a seventh embodiment of the disclosure.

FIG. 30 is a schematic diagram of an optical imaging lens of a seventh embodiment of the disclosure. FIG. 31A to FIG. 31H are diagrams of longitudinal spherical aberrations and various optical aberrations of the optical imaging lens of the seventh embodiment. First, referring to FIG. 30, the seventh embodiment of the optical imaging lens 10 of the disclosure is approximately similar to the first embodiment, and their differences are as follows: the optical data, aspheric coefficients, and parameters among the lens elements 1, 2, 3, 4, 5. 6, and 7 are more or less different. In addition, in this embodiment, the optical axis region 561 of the image-side surface 56 of the fifth lens element 5 is convex. The periphery region 653 of the object-side surface 65 of the sixth lens element 6 is convex. It should be noted here that, in order to clearly show the figure, the reference numerals of the optical axis region and the periphery region with similar surface shapes to those of the first embodiment are partially omitted in FIG. 30.

Detailed optical data of the optical imaging lens 10 of the seventh embodiment are as shown in FIG. 32. In addition, when the adjustable air gaps D1, D2, and D3 of the optical imaging lens 10 of the seventh embodiment are respectively 1.348 mm, 2.663 mm, and 0.773 mm, the optical imaging lens 10 is in a short-focal-length mode, and has an effective focal length of 10.730 mm, an F-number of 2.310, a half field of view of 16.365 degrees, and an image height of 3.100 mm. Moreover, the distance from the object-side surface 15 of the first lens element 1 to the image-side surface 76 of the seventh lens element 7 on the optical axis I is 15.722 mm, and the distance from the image-side surface 76 of the seventh lens element 7 to the image plane 99 on the optical axis I is 1.483 mm. Comparatively, when the adjustable air gaps D1, D2, and D3 of the optical imaging lens 10 of the seventh embodiment are respectively 1.243 mm. 0.148 mm, and 5.977 mm, the optical imaging lens 10 is in a long-focal-length mode, and has an effective focal length of 16.166 mm, an F-number of 3.480, a half field of view of 10.906 degrees, and an image height of 3.100 mm. Moreover, the distance from the object-side surface of the first lens element 1 to the image-side surface 76 of the seventh lens element 7 on the optical axis I is 13.102 mm, and the distance from the image-side surface 76 of the seventh lens element 7 to the image plane 99 on the optical axis I is 6.687 mm.

As shown in FIG. 33, FIG. 33 shows the aspheric coefficients of the object-side surface 15 of the first lens element 1 to the image-side surface 76 of the seventh lens element 7 of the seventh embodiment in Formula (1) above.

In addition, the relationships between the important parameters in the optical imaging lens 10 of the seventh embodiment are as shown in FIG. 39.

The longitudinal spherical aberrations of the seventh embodiment respectively in the long-focal-length mode and the short-focal-length mode are as shown in FIG. 31A and FIG. 31E, and deviations of imaging points of off-axis rays at different heights are controlled within a range of +0.06 mm. In the four diagrams of FIG. 31B, FIG. 31C, FIG. 31F, and FIG. 31G showing field curvature aberrations respectively in the long-focal-length mode and the short-focal-length mode, changes in focal lengths of the three representative wavelengths within the entire field of view fall within +0.05 mm. The diagrams of FIG. 31D and FIG. 31H showing distortion aberrations in the long-focal-length mode and the short-focal-length mode show that the distortion aberrations of this embodiment are maintained within a range of +1.8%.

As can be known from the above description, the F-number of the seventh embodiment is smaller than the F-number of the first embodiment. Therefore, compared with the first embodiment, the seventh embodiment has a greater amount of light admitted. In addition, the longitudinal spherical aberrations of the seventh embodiment are smaller than the longitudinal spherical aberrations of the first embodiment, the field curvature aberrations of the seventh embodiment are smaller than the field curvature aberrations of the first embodiment, and the distortion aberrations of the seventh embodiment are smaller than the distortion aberrations of the first embodiment.

Figure 34:
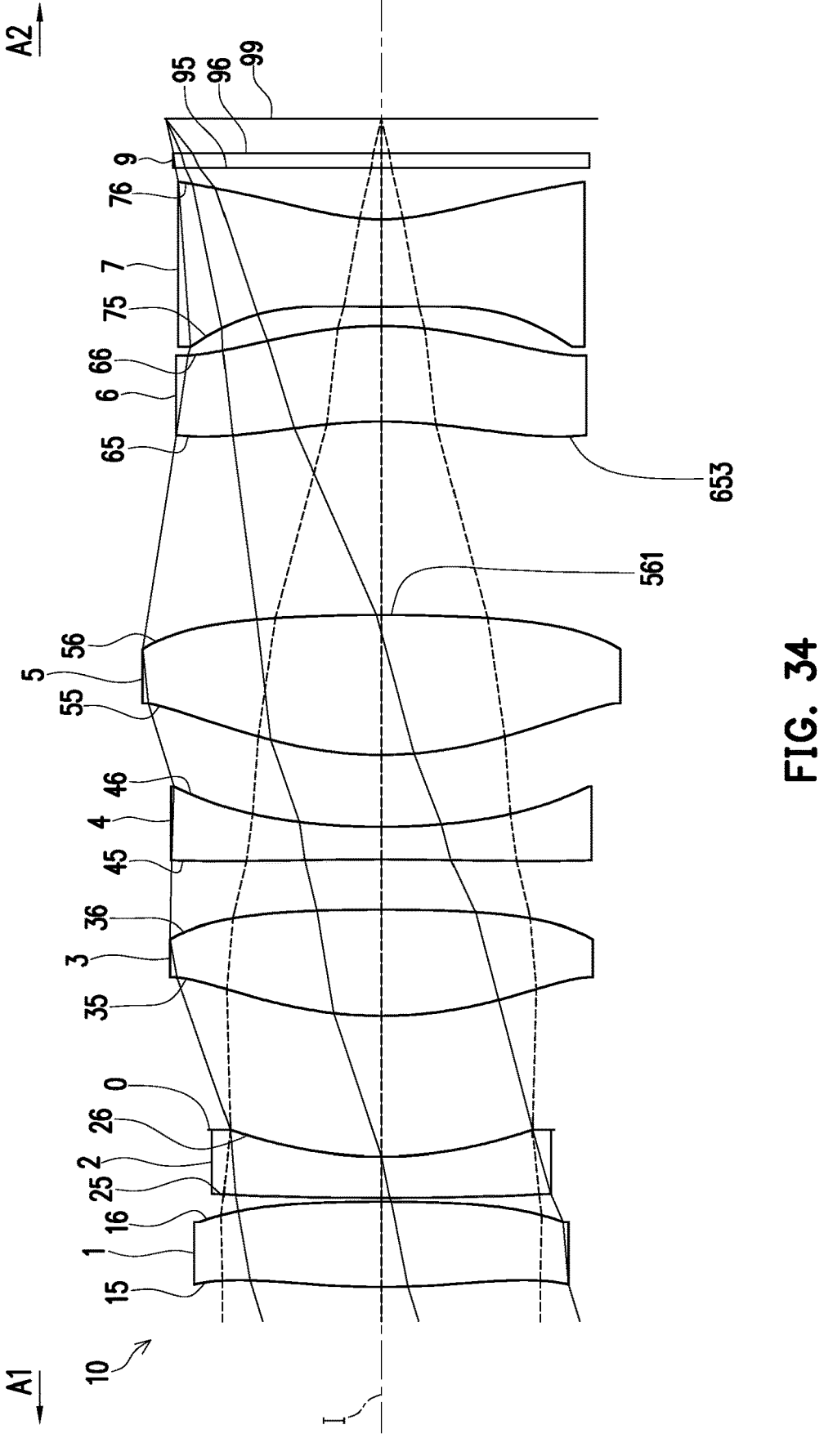
FIG. 34 is a schematic diagram of an optical imaging lens of an eighth embodiment of the disclosure.

FIG. 34 is a schematic diagram of an optical imaging lens of an eighth embodiment of the disclosure. FIG. 35A to FIG. 35H are diagrams of longitudinal spherical aberrations and various optical aberrations of the optical imaging lens of the optical imaging lens. First, referring to FIG. 34, the eighth embodiment of the optical imaging lens 10 of the disclosure is approximately similar to the first embodiment, and their differences are as follows: the optical data, aspheric coefficients, and parameters among the lens elements 1, 2, 3, 4, 5. 6, and 7 are more or less different. In addition, in this embodiment, the optical axis region 561 of the image-side surface 56 of the fifth lens element 5 is convex. The periphery region 653 of the object-side surface 65 of the sixth lens element 6 is convex. It should be noted here that, in order to clearly show the figure, the reference numerals of the optical axis region and the periphery region with similar surface shapes to those of the first embodiment are partially omitted in FIG. 34.

Detailed optical data of the optical imaging lens 10 of the eighth embodiment are as shown in FIG. 36. In addition, when the adjustable air gaps D1, D2, and D3 of the optical imaging lens 10 of the eighth embodiment are respectively 2.028 mm. 2.780 mm and 0.740 mm, the optical imaging lens 10 is in a short-focal-length mode, and has an effective focal length of 10.273 mm, an F-number of 2.195, a half field of view of 16.963 degrees, and an image height of 3.100 mm. Moreover, the distance from the object-side surface 15 of the first lens element 1 to the image-side surface 76 of the seventh lens element 7 on the optical axis I is 15.367 mm, and the distance from the image-side surface 76 of the seventh lens element 7 to the image plane 99 on the optical axis I is 1.450 mm. Comparatively, when the adjustable air gaps D1, D2, and D3 of the optical imaging lens 10 of the eighth embodiment are respectively 0.088 mm. 0.160 mm, and 6.129 mm, the optical imaging lens 10 is in a long-focal-length mode, and has an effective focal length of 15.924 mm, an F-number of 3.403, a half field of view of 10.934 degrees, and an image height of 3.100 mm. Moreover, the distance from the object-side surface of the first lens element 1 to the image-side surface 76 of the seventh lens element 7 on the optical axis I is 10.807 mm, and the distance from the image-side surface 76 of the seventh lens element 7 to the image plane 99 on the optical axis I is 6.839 mm.

As shown in FIG. 37, FIG. 37 shows the aspheric coefficients of the object-side surface 15 of the first lens element 1 to the image-side surface 76 of the seventh lens element 7 of the eighth embodiment in Formula (1) above.

In addition, the relationships between the important parameters in the optical imaging lens 10 of the eighth embodiment are as shown in FIG. 39.

The longitudinal spherical aberrations of the eighth embodiment respectively in the long-focal-length mode and the short-focal-length mode are as shown in FIG. 35A and FIG. 35E, and deviations of imaging points of off-axis rays at different heights are controlled within a range of +0.035 mm. In the four diagrams of FIG. 35B. FIG. 35C, FIG. 35F, and FIG. 35G showing field curvature aberrations respectively in the long-focal-length mode and the short-focal-length mode, changes in focal lengths of the three representative wavelengths within the entire field of view fall within +0.035 mm. The diagrams of FIG. 35D and FIG. 35H showing distortion aberrations in the long-focal-length mode and the short-focal-length mode show that the distortion aberrations of this embodiment are maintained within a range of +1%.

As can be known from the above description, the F-number of the eighth embodiment is smaller than the F-number of the first embodiment. Therefore, compared with the first embodiment, the eighth embodiment has a greater amount of light admitted. In addition, the longitudinal spherical aberrations of the eighth embodiment are smaller than the longitudinal spherical aberrations of the first embodiment, the field curvature aberrations of the eighth embodiment are smaller than the field curvature aberrations of the first embodiment, and the distortion aberrations of the eighth embodiment are smaller than the distortion aberrations of the first embodiment.

Then, referring to FIG. 38 and FIG. 39 in conjunction. FIG. 38 shows a table diagram of various optical parameters of the first embodiment to the fourth embodiment, and FIG. 39 shows a table diagram of various optical parameters of the fifth embodiment to the eighth embodiment. As can be seen from the optical imaging lens 10 of each of the above-mentioned embodiments, the optical imaging lens 10 of the embodiments of the disclosure can achieve the following:

I. When the second lens element 2 has negative refracting power or the third lens element 3 has positive refracting power, the spherical aberration generated during changing the focal length of the optical imaging system can be reduced. Conjunctively, when the periphery region 453 of the object-side surface 45 of the fourth lens element 4 is convex, the fifth lens element 5 has positive refracting power, the sixth lens element 6 has positive refracting power, the optical axis region 761 of the object-side surface 76 of the seventh lens element 7 is the convex, and the optical imaging lens 10 has at least one adjustable air gap on the optical axis I, the volume of the optical imaging lens 10 can be controlled, and the optical imaging lens 10 can have good optical quality under different focal lengths.

II. Further to point I above, if it is further satisfied that the first lens element 1 has positive refracting power, incident rays at different angles can be effectively converged.

III. In the optical imaging lens 10 of the disclosure, when the periphery region 453 of the object-side surface 45 of the fourth lens element 4 is convex, edge aberrations of the image plane 99 can be improved. Conjunctively, when the fifth lens element 5 has positive refracting power, the sixth lens element 6 has positive refracting power, the optical axis region 751 of the object-side surface 75 of the seventh lens element 7 is convex, the periphery region 753 of the object-side surface 75 of the seventh lens element 7 is concave, and the optical imaging lens 10 has at least one adjustable air gap on the optical axis I, the volume of the optical imaging lens 10 can be controlled, and the optical imaging lens 10 can have good optical quality under different focal lengths.

IV. In the optical imaging lens 10 of the disclosure, when the first lens element 1 has positive refracting power, the periphery region 163 of the image-side surface 16 of the first lens element 1 is convex, and the periphery region 453 of the object-side surface 45 of the fourth lens element 4 is convex, incident rays at different angles can be effectively converged, and edge aberrations of the image plane 99 can be improved. Conjunctively, when the fifth lens element 5 has positive refracting power, the seventh lens element 7 has negative refracting power, the optical axis region 761 of the image-side surface 76 of the seventh lens element 7 is concave, and the optical imaging lens 10 has at least one adjustable air gap on the optical axis I, the volume of the optical imaging lens 10 can be controlled, and the optical imaging lens 10 can have good optical quality under different focal lengths.

V. Further to point IV above, if it is further satisfied that the second lens element 2 has negative refracting power or the third lens element 3 has positive refracting power or the sixth lens element 6 has positive refracting power, the spherical aberration generated during changing the focal length of the optical imaging system can be reduced.

VI. In the optical imaging lens 10 of the disclosure, when the periphery region 163 of the image-side surface 16 of the first lens element 1 is convex, the periphery region 263 of the image-side surface 26 of the second lens element 2 is concave, the third lens element 3 has positive refracting power, edge aberrations of the image plane 99 can be improved. Conjunctively, when the fifth lens element 5 has positive refracting power, the seventh lens element 7 has negative refracting power, the optical axis region 761 of the image-side surface 76 of the seventh lens element 7 is concave, and the optical imaging lens 10 has at least one adjustable air gap on the optical axis I, the volume of the optical imaging lens 10 can be controlled, and the optical imaging lens 10 can have good optical quality under different focal lengths. When it is further satisfied that the first lens element 1 has positive refracting power or the second lens element 2 has negative refracting power or the sixth lens element 6 has positive refracting power, the spherical aberration generated during changing the focal length of the optical imaging system can be reduced.

VII. In the optical imaging lens 10 of the disclosure, respective air gaps are present between two adjacent optical devices (e.g., between the aperture 0 and a lens element, or between lens elements, or between a lens element and the filter 9) on the optical axis I. Among the air gaps, the number of adjustable air gaps is at least one and at most three. In the meantime, between the first lens element 1 to the seventh lens element 7, the number of adjustable air gaps is at least one and at most two. By controlling the number of adjustable air gaps, it is possible to prevent an excessively large overall assembly volume of the optical imaging lens, which facilitates meeting the requirements of being light, thin, short, and small, and maintaining the assembly yield rate.

VIII. In the disclosure, when the zoom ratio, the back focal length, the effective focal length, and the changes thereof satisfy the following ranges or proportional relationships, the distortion and field curvature aberrations of the optical imaging system can be preferably improved, where the optical imaging lens 10 satisfies EFL≤23.000 mm, with a preferable range of 8.800 mm≤EFL≤23.000 mm;

the optical imaging lens 10 satisfies ΔEFL≥4.400 mm, with a preferable range of 4.400 mm≤ΔEFL≤12.000 mm;

the optical imaging lens 10 satisfies ft/fw≥1.450, with a preferable range of 1.450≤ ft/fw≤2.100;

the optical imaging lens 10 satisfies ΔEFL/ΔBFL≤1.700, with a preferable range of 1.000≤ΔEFL/ΔBFL≤1.700;

the optical imaging lens 10 satisfies ΔEFL/ΔAAG≤2.300, with a preferable range of 0.900≤ΔEFL/ΔAAG≤2.300;

the optical imaging lens 10 satisfies $\Delta EFL/\Delta Gmax \leq 4.200$, with a preferable range of $1.500 \leq \Delta EFL/\Delta Gmax \leq 4.200$;

the optical imaging lens 10 satisfies $TL/BFL \leq 10.600$, with a preferable range of $1.000 \leq TL/BFL \leq 10.600$;

the optical imaging lens 10 satisfies $TTL/(AAG+BFL) \geq 1.600$, with a preferable range of $1.600 \leq TTL/(AAG+BFL) \leq 2.450$; and the optical imaging lens 10 satisfies $(AAG+BFL)/Tavg \leq 8.900$, with a preferable range of $1.300 \leq (AAG+BFL)/Tavg \leq 8.900$.

IX. When the material of the lens element satisfies the following limitations, the chromatic aberration and spherical aberration generated during the zooming process can be effectively suppressed, and the optical imaging lens 10 can have good resolution under different focal lengths, where the optical imaging lens 10 satisfies $V1+V2+V6 \leq 125.000$, with a preferable range of $76.000 \leq V1+V2+V6 \leq 125.000$;

the optical imaging lens 10 satisfies $V1+V3+V4 \leq 125.000$, with a preferable range of $95.000 \leq V1+V3+V4 \leq 125.000$; and the optical imaging lens 10 satisfies $V2+V5+V6+V7 \leq 180.000$, with a preferable range of $150.000 \leq V2+V5+V6+V7 \leq 180.000$.

X. In order to ensure the imaging quality while considering the difficulty in manufacturing, the air gaps between the lens elements or the thicknesses of the lens elements are appropriately shortened or maintained at a certain ratio. When the following numerical limitations of conditional expressions are satisfied, the embodiments of the disclosure can have a preferable configuration.

where the optical imaging lens 10 satisfies $TTL/Tmax \leq 10.000$, with a preferable range of $5.900 \leq TTL/Tmax \leq 10.000$;

the optical imaging lens 10 satisfies $AAG/Tmin \leq 15.300$, with a preferable range of $2.650 \leq AAG/Tmin \leq 15.300$;

the optical imaging lens 10 satisfies $ALT/(T3+G34+T4) \leq 3.300$, with a preferable range of $2.000 \leq ALT/(T3+G34+T4) \leq 3.300$;

the optical imaging lens 10 satisfies $(T1+G12+T2+G23+T3)/T7 \leq 7.700$, with a preferable range of $2.500 \leq (T1+G12+T2+G23+T3)/T7 \leq 7.700$;

the optical imaging lens 10 satisfies $TTL/(T1+T7) \leq 9.200$, with a preferable range of $6.100 \leq TTL/(T1+T7) \leq 9.200$;

the optical imaging lens 10 satisfies $ALT/(Tmax+Tmin) \geq 2.800$, with a preferable range of $2.800 \leq ALT/(Tmax+Tmin) \leq 4.200$;

the optical imaging lens 10 satisfies $TL/(T5+G56+T6+G67+T7) \leq 2.900$, with a preferable range of $1.700 \leq TL/(T5+G56+T6+G67+T7) \leq 2.900$;

the optical imaging lens 10 satisfies $(T6+G67+T7)/(T1+G12+T2) \geq 1.550$, with a preferable range of $1.550 \leq (T6+G67+T7)/(T1+G12+T2) \leq 2.650$;

the optical imaging lens 10 satisfies $TTL/(T4+G45+T5) \leq 8.800$, with a preferable range of $4.000 \leq TTL/(T4+G45+T5) \leq 8.800$;

the optical imaging lens 10 satisfies $Tmax/Tmin \leq 6.000$, with a preferable range of $3.500 \leq Tmax/Tmin \leq 6.000$;

the optical imaging lens 10 satisfies $(T3+T6)/(T1+T2) \geq 1.600$, with a preferable range of $1.600 \leq (T3+T6)/(T1+T2) \leq 4.000$; and the optical imaging lens 10 satisfies $(T3+G34+T4+G45+T5)/(T1+G12+T2) \geq 2.300$, with a preferable range of $2.300 \leq (T3+G34+T4+G45+T5)/(T1+G12+T2) \leq 4.800$.

24

In addition, any combinational relationship between the parameters of the embodiments may be additionally selected to add limitations on lenses to facilitate design of lenses with the same structure of the disclosure.

In view of the unpredictability of optical system design, under the architecture of the disclosure, satisfying the above conditional expressions can better reduces the system length, increase the available aperture size, improve the imaging quality, or improve the assembly yield rate of the lens of the disclosure over the prior art. Moreover, the adoption of plastic materials for the lens elements of the embodiments of disclosure further reduce the weight and the cost of the lens.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $a_2$ is a minimum value of the optical parameter A among the plurality of embodiments. $\beta_1$ is a maximum value of the optical parameter B among the plurality of embodiments, and $\beta2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E. and E is, for example $A+B$ or $A-B$ or $A/B$ or $A*B$ or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical imaging lens, comprising a first lens element, a second lens element, a third lens element, a fourth lens element, a fifth lens element, a sixth lens element, and a seventh lens element sequentially arranged along an optical axis from an object side to an image side, wherein each of the first lens element to the seventh lens element comprises an object-side surface facing the object side and allowing an imaging ray to pass through and an image-side surface facing the image side and allowing the imaging ray to pass through;

the second lens element has negative refracting power or the third lens element has positive refracting power;

a periphery region of the object-side surface of the second lens element is convex;

a periphery region of the object-side surface of the fourth lens element is convex;

the fifth lens element has positive refracting power;

the sixth lens element has positive refracting power; and an optical axis region of the object-side surface of the seventh lens element is convex;

wherein lens elements of the optical imaging lens are only the seven lens elements, and the optical imaging lens has at least one adjustable air gap.

2. The optical imaging lens according to claim 1, wherein the optical imaging lens satisfies V1+V2+V6≤125.000, where V1 is an Abbe number of the first lens element, V2 is an Abbe number of the second lens element, and V6 is an Abbe number of the sixth lens element.

3. The optical imaging lens according to claim 1, wherein the optical imaging lens satisfies TTL/Tmax≤10.000, where TTL is a distance from the object-side surface of the first lens element to an image plane on the optical axis, and Tmax is a maximum value of thicknesses of the seven lens elements from the first lens element to the seventh lens element on the optical axis.

4. The optical imaging lens according to claim 1, wherein the optical imaging lens satisfies AAG/Tmin≤15.300, where AAG is a sum of six air gaps between the first lens element to the seventh lens element on the optical axis, and Tmin is a minimum value of thicknesses of the seven lens elements from the first lens element to the seventh lens element on the optical axis.

5. The optical imaging lens according to claim 1, wherein the optical imaging lens satisfies ALT/(T3+G34+T4)≤3.300, where ALT is a sum of thicknesses of the seven lens elements from the first lens element to the seventh lens element on the optical axis, T3 is a thickness of the third lens element on the optical axis, G34 is an air gap between the third lens element and the fourth lens element on the optical axis, and T4 is a thickness of the fourth lens element on the optical axis.

6. The optical imaging lens according to claim 1, wherein the optical imaging lens satisfies (T1+G12+T2+G23+T3)/T7≤7.700, where T1 is a thickness of the first lens element on the optical axis, G12 is an air gap between the first lens element and the second lens element on the optical axis, T2 is a thickness of the second lens element on the optical axis, G23 is an air gap between the second lens element and the third lens element on the optical axis, T3 is a thickness of the third lens element on the optical axis, and T7 is a thickness of the seventh lens element on the optical axis.

7. The optical imaging lens according to claim 1, wherein the optical imaging lens satisfies TL/BFL≤10.600, where TL is a distance from the object-side surface of the first lens element to the image-side surface of the seventh lens element on the optical axis, and BFL is a distance from the image-side surface of the seventh lens element to an image plane on the optical axis.

8. An optical imaging lens, comprising a first lens element, a second lens element, a third lens element, a fourth lens element, a fifth lens element, a sixth lens element, and a seventh lens element sequentially arranged along an optical axis from an object side to an image side, wherein each of the first lens element to the seventh lens element comprises an object-side surface facing the object side and allowing an imaging ray to pass through and an image-side surface facing the image side and allowing the imaging ray to pass through;

a periphery region of the object-side surface of the second lens element is convex;

a periphery region of the object-side surface of the fourth lens element is convex;

the fifth lens element has positive refracting power;

the sixth lens element has positive refracting power; and an optical axis region of the object-side surface of the seventh lens element is convex and a periphery region of the object-side surface of the seventh lens element is concave;

wherein lens elements of the optical imaging lens are only the seven lens elements, and the optical imaging lens has at least one adjustable air gap.

9. The optical imaging lens according to claim 8, wherein the optical imaging lens satisfies V1+V3+V4=125.000, where V1 is an Abbe number of the first lens element, V3 is an Abbe number of the third lens element, and V4 is an Abbe number of the fourth lens element.

10. The optical imaging lens according to claim 8, wherein the optical imaging lens satisfies TTL/(T1+T7)≤9.200, where TTL is a distance from the object-side surface of the first lens element to an image plane on the optical axis, T1 is a thickness of the first lens element on the optical axis, and T7 is a thickness of the seventh lens element on the optical axis.

11. The optical imaging lens according to claim 8, wherein the optical imaging lens satisfies ALT/(Tmax+Tmin)≥2.800, where ALT is a sum of thicknesses of the seven lens elements from the first lens element to the seventh lens element on the optical axis, Tmax is a maximum value of the thicknesses of the seven lens elements from the first lens element to the seventh lens element on the optical axis, and Tmin is a minimum value of the thicknesses of the seven lens elements from the first lens element to the seventh lens element on the optical axis.

12. The optical imaging lens according to claim 8, wherein the optical imaging lens satisfies TL/(T5+G56+T6+G67+T7)≤2.900, where TL is a distance from the object-side surface of the first lens element to the image-side surface of the seventh lens element on the optical axis, T5 is a thickness of the fifth lens element on the optical axis, G56 is an air gap between the fifth lens element and the sixth lens element on the optical axis, T6 is a thickness of the sixth lens element on the optical axis, G67 is an air gap between the sixth lens element and the seventh lens element on the optical axis, and T7 is a thickness of the seventh lens element on the optical axis.

13. The optical imaging lens according to claim 8, wherein the optical imaging lens satisfies $(T6+G67+T7)/(T1+G12+T2) \geq 1.550$, where T6 is a thickness of the sixth lens element on the optical axis, G67 is an air gap between the sixth lens element and the seventh lens element on the optical axis, T7 is a thickness of the seventh lens element on the optical axis, T1 is a thickness of the first lens element on the optical axis, G12 is an air gap between the first lens element and the second lens element on the optical axis, and T2 is a thickness of the second lens element on the optical axis.

14. The optical imaging lens according to claim 8, wherein the optical imaging lens satisfies TTL/(AAG+BFL) $\geq 1.600$, where TTL is a distance from the object-side surface of the first lens element to an image plane on the optical axis, AAG is a sum of six air gaps between the first lens element to the seventh lens element on the optical axis, and BFL is a distance from the image-side surface of the seventh lens element to the image plane on the optical axis.

15. An optical imaging lens, comprising a first lens element, a second lens element, a third lens element, a fourth lens element, a fifth lens element, a sixth lens element, and a seventh lens element sequentially arranged along an optical axis from an object side to an image side, wherein each of the first lens element to the seventh lens element comprises an object-side surface facing the object side and allowing an imaging ray to pass through and an image-side surface facing the image side and allowing the imaging ray to pass through;

the first lens element has positive refracting power and a periphery region of the image-side surface of the first lens element is convex;

a periphery region of the object-side surface of the fourth lens element is convex;

the fifth lens element has positive refracting power; and the seventh lens element has negative refracting power and an optical axis region of the image-side surface of the seventh lens element is concave;

wherein lens elements of the optical imaging lens are only the seven lens elements, and the optical imaging lens has at least one adjustable air gap.

16. The optical imaging lens according to claim 15, wherein the optical imaging lens satisfies V2+V5+V6+V7$\leq$180.000, where V2 is an Abbe number of the second lens element, V5 is an Abbe number of the fifth lens element, V6 is an Abbe number of the sixth lens element, and V7 is an Abbe number of the seventh lens element.

17. The optical imaging lens according to claim 15, wherein the optical imaging lens satisfies TTL/(T4+G45+T5)$\leq$8.800, where TTL is a distance from the object-side surface of the first lens element to an image plane on the optical axis, T4 is a thickness of the fourth lens element on the optical axis, G45 is an air gap between the fourth lens element and the fifth lens element on the optical axis, and T5 is a thickness of the fifth lens element on the optical axis.

18. The optical imaging lens according to claim 15, wherein the optical imaging lens satisfies Tmax/Tmin$\leq$6.000, where Tmax is a maximum value of thicknesses of the seven lens elements from the first lens element to the seventh lens element on the optical axis, and Tmin is a minimum value of the thicknesses of the seven lens elements from the first lens element to the seventh lens element on the optical axis.

19. The optical imaging lens according to claim 15, wherein the optical imaging lens satisfies (AAG+BFL)/Tavg$\leq$8.900, where AAG is a sum of six air gaps between the first lens element to the seventh lens element on the optical axis, BFL is a distance from the image-side surface of the seventh lens element to an image plane on the optical axis, and Tavg is an average value of thicknesses of the seven lens elements from the first lens element to the seventh lens element on the optical axis.

20. The optical imaging lens according to claim 15, wherein the optical imaging lens satisfies (T3+T6)/(T1+T2) $\geq 1.600$, where T3 is a thickness of the third lens element on the optical axis, T6 is a thickness of the sixth lens element on the optical axis, T1 is a thickness of the first lens element on the optical axis, and T2 is a thickness of the second lens element on the optical axis.

* * * * *